United States Patent [19]

Reisch et al.

[11] Patent Number: 5,168,375
[45] Date of Patent: Dec. 1, 1992

[54] IMAGE RECONSTRUCTION BY USE OF DISCRETE COSINE AND RELATED TRANSFORMS

[75] Inventors: Michael L. Reisch, Carlisle; Munib A. Wober, Haverhill, both of Mass.

[73] Assignee: Polaroid Corporation, Cambridge, Mass.

[21] Appl. No.: 761,660

[22] Filed: Sep. 18, 1991

[51] Int. Cl.$^5$ .............................................. H04N 5/14
[52] U.S. Cl. ...................................... 358/432; 358/166
[58] Field of Search ............................... 358/166–167, 358/432, 426, 133, 36–37, 13; 382/25

[56] References Cited

U.S. PATENT DOCUMENTS

| | | | |
|---|---|---|---|
| 4,213,150 | 7/1980 | Robinson et al. | 358/166 |
| 4,302,775 | 11/1981 | Widergren et al. | 358/136 |
| 4,330,833 | 5/1982 | Pratt et al. | 364/515 |
| 4,442,454 | 4/1984 | Powell | 358/167 |
| 4,517,599 | 5/1985 | Zwirn et al. | 358/166 |
| 4,553,165 | 11/1985 | Bayer | 358/167 |
| 4,623,913 | 11/1986 | Fling et al. | 358/166 |
| 4,623,923 | 11/1986 | Orbach | 358/166 |
| 4,630,307 | 12/1986 | Cok | 382/25 |
| 4,639,769 | 1/1987 | Fleisher et al. | 358/27 |
| 4,646,152 | 2/1987 | Eichelberger et al. | 358/166 |
| 4,683,496 | 7/1987 | Tom | 358/166 |
| 4,694,328 | 9/1987 | LoCicero et al. | 358/21 |
| 4,720,871 | 1/1988 | Chambers | 382/42 |
| 4,757,373 | 7/1988 | Van Rooy | 358/37 |
| 4,760,605 | 7/1988 | David et al. | 382/47 |
| 4,768,082 | 8/1988 | Hiratsuka et al. | 358/13 |
| 4,783,840 | 11/1988 | Song | 382/54 |
| 4,797,729 | 1/1989 | Tsai | 358/13 |
| 4,803,548 | 2/1989 | Kirk | 358/36 |
| 4,805,031 | 2/1989 | Powell | 358/284 |
| 4,807,033 | 2/1989 | Keesen et al. | 358/167 |
| 4,809,070 | 2/1989 | Lake, Jr. | 358/166 |
| 4,868,654 | 9/1989 | Juri et al. | 358/133 |
| 4,908,698 | 3/1990 | Enomoto et al. | 358/13 |
| 4,929,381 | 5/1990 | Clark | 252/174 |

Primary Examiner—Stephen Brinich
Attorney, Agent, or Firm—Edward S. Roman

[57] ABSTRACT

A method for processing a field of image data samples to provide for one or more of the functions of decimation, interpolation, and sharpening is accomplished by use of an array transform processor such as that employed in a JPEG compression system.[1] Blocks of data samples are transformed by the discrete even cosine transform (DECT) in both the decimation and interpolation processes, after which the number of frequency terms is altered. In the case of decimation, the number of frequency terms is reduced, this being followed by inverse transformation to produce a reduced-size matrix of sample points representing the original block of data. In the case of interpolation, additional frequency components of zero value are inserted into the array of frequency components after which inverse transformation produces an enlarged data sampling set without an increase in spectral bandwidth. In the case of sharpening, accomplished by a convolution or filtering operation involving multiplication of transforms of data and filter kernel in the frequency domain, there is provided an inverse transformation resulting in a set of blocks of processed data samples. The blocks are overlapped followed by a savings of designated samples, and a discarding of excess samples from regions of overlap. The spatial representation of the kernel is modified by reduction of the number of components, for a linear-phase filter, and zero-padded to equal the number of samples of a data block, this being followed by forming the discrete odd cosine transform (DOCT) of the padded kernel matrix.

22 Claims, 10 Drawing Sheets

IMAGE RECONSTRUCTION BY USE OF DISCRETE COSINE AND RELATED TRANSFORMS

BACKGROUND OF THE INVENTION

This invention relates to the transformation of imaging data by a discrete cosine transformation and, more particularly, to the sharpening and scaling of two dimensional images by use of even and odd cosine transformations compatible with circuitry of the JPEG (Joint Photographic Expert Group) and MPEG (Motion Picture Expert Group) international compression standard.

Image processing is employed in numerous situations including electronic processing of photographic images, reconstruction of images in a printing process, and the filtering and reconstruction of images in the transmission of images in a communication system. Various techniques employed in image processing may be reviewed briefly by considering systems employed for storage and transmission of image or video data.

Systems for storage of image or video data, as well as for the transmission of image or video data are constructed generally of some form of electronic camera or electro-optic scanner for viewing a subject, followed by signal processing circuitry for transforming the signal, and/or encoding the signal to provide a format of compressed data. The compressed format of data facilitates storage by reduction of the number of data points to be stored, and facilitates transmission by reducing the number of data points to be transmitted. In the case of data transmission, by way of example, the reduction of data points permits a reduction of necessary bandwidth or an increased speed of transmission. At a receiver, the image data is retrieved by inverse transformation and/or decoding, followed by presentation on a display. Of particular interest herein is data compression by use of JPEG and/or MPEG signal processing.

By way of example, in such a video storage or video communication system, image data of a subject may be obtained with an electronic camera having a CCD (charge coupled device) array of detecting elements for detecting pixels of an image of a scene to be viewed. A two-dimensional CCD array may employ a million cells providing black and white data. Strips of filter material may be employed for detection of color in the scene being viewed. The CCDs output analog voltage pulses which may be shifted, in the manner of operation of a shift-register, to allow a succession of the pulses to provide the data serially to an analog-to-digital converter. Digital signals outputted by the analog-to-digital converter are stored for subsequent digital processing.

The digital signals are processed by electronic signal processing circuitry. Of particular interest herein, is the processing of digital signals, including digital signal transformation by use of the discrete cosine transform, as is employed by JPEG compression. While the specific area of interest herein lies in the use of the cosine transform, it is useful for the general understanding of digital signal processing, including various aspects of sampling, filtering and coding, to consider related signal processing techniques. For example, with reference to the following U.S. patents, the Walsh-Hadamard transform is mentioned in Powell, U.S. Pat. No. 4,442,454 (Abstract), and Bayer, U.S. Pat. No. 4,553,165 (Abstract). Horizontal synchronization of signals from television video including luminance Y. and chrominance I and Q components, as well as Huffman and run-length decoding and a FIFO memory are disclosed in Widergren, U.S. Pat. No. 4,302,775 (Columns 7 and 11). The Z transform is disclosed in David, U.S. Pat. No. 4,760,605 (Columns 9 and 10). Implementation of a discrete cosine transformation is disclosed Keesen, U.S. Pat. No. 4,807,033. Spatial sampling frequency is disclosed in Lake, U.S. Pat. No. 4,809,070 (Column 5).

One aspect in the use of the foregoing techniques for the transmission of pictorial data is the efficiency with which data can be stored or transmitted. For example, data compression, which may employ the counting of contiguous pixels having a common value of luminance rather than a separate storage or transmission of individual ones of the pixels, is readily implemented by the Huffman coding. Improved precision, or immunity from noise, is attained by signal transformation such as the discrete cosine transformation. It is noted, however, that the electrical circuitry employed for accomplishing these functions, such as the discrete cosine transformer is very complex.

There are other functions which can also be applied in the utilization of pictorial data, such as the functions of sharpening an image or scaling an image. Sharpening refers to enhancement or an image by accentuation of boundaries of objects in the image, as by increasing amplitudes of higher-frequency components of the image to counteract a reduction of the amplitudes of higher-frequency components which may have occurred during transmission of the image. Scaling is used in the sense of resampling to alter the number of pixels in a line of pixels so as to enable presentation of an image on a display having a different number of pixels per line than is present in the array of detectors which forms the original image. Heretofore, such additional functions have been accomplished by the use of additional circuitry, such as filter circuits for sharpening an image and a resampling system for scaling an image.

A problem arises in that there has been a necessity for employing the additional circuitry for accomplishing the additional functions even though there is circuitry, namely, the circuitry of the discrete cosine transformer which, due to its great operating speed, can be used for a multifunctional capacity. Array transform circuitry of the discrete cosine transformer is employed for data compression in a JPEG compression system, and provides both the discrete cosine transform (DCT) and the inverse discrete cosine transform (IDCT).

SUMMARY OF THE INVENTION

The aforementioned problem is overcome and other advantages are provided by circuitry of the invention for enhancing the processing of imaging data for generating an improved image of a scene. The invention provides for a major saving in electronic circuitry by use of existing JPEG array transform circuitry which provides the discrete cosine transform (DCT) and the inverse discrete cosine transform (IDCT). Therefore, in any electronic signal processing system which incorporates JPEG (or MPEG) compression equipment, the invention can be practiced by use of the available array transform circuitry. Furthermore, since the JPEG cosine transformer operates at great speed, the signal processing of the invention can be accomplished rapidly.

There are three aspects to the practicing of the invention, namely, (1) a reduction in the number of signal samples for reduced storage requirements and more rapid transmission of an image, (2) a process of sharpening details of the image, and (3) an interpolation, or resampling, of data to accommodate the number of pixels in rows and columns of an image as originally detected to the number of elements, or pixels, in a display presenting the image. The reduction of samples is accomplished in the frequency domain with the discrete cosine transform by a process of decimation. The sharpening of the image is accomplished by block-processing of data in the frequency domain with the discrete cosine transform by use of a filter kernel and an overlapping of contiguous blocks, this being equivalent to convolution in the spatial domain. The interpolation process is accomplished in the frequency domain with the discrete cosine transform for introducing additional sample points, without affecting the spectrum of the image, for matching the image to the pixel array of a display.

With respect to the use of the DCT, it is important to note that there is more than one mathematical expression for the DCT. More specifically, it is possible to express the DCT in terms of an even transform, the DECT, and in terms of an odd transform, the DOCT as will be described hereinafter. The term DCT as used in the literature (JPEG, MPEG) is in reference to the even transform. However, in the practice of the invention, there is use of both even (DECT) and odd (DOCT) forms of the cosine transform where processing by multiplication in the frequency domain is to provide the equivalent of convolution in the spatial domain. The DOCT is employed for those situations in which convolution is to be accomplished by use of a filter kernel having symmetry in the spatial domain, this being a linear phase filter. The invention includes zero-padding of coefficient arrays of the DCT to enlarge, when necessary, the size of a coefficient array to conform to the size of an array processor in a standard JPEG image compression system. The zero padding may be used for accomplishing both the forward and the inverse DCT, the zero padding being particularly useful in the decimation and the interpolation processes.

The foregoing accommodation of the size of an array of transform coefficients to fit the array block size of JPEG circuitry, enables the significant saving of circuitry in the practice of the foregoing three aspects of the invention when the invention is practiced in conjunction with an existing JPEG image processing system. In the practice of the invention, it has been recognized that the existing transform circuitry of the JPEG system operates sufficiently fast so as to present adequate free time for the processing of mathematical manipulations of frequency-coefficient matrices and transform-coefficient matrices of the invention without a necessity of replicating additional circuitry for matrix manipulations.

In the decimation process, there is a constraint on the reduction of signal samples, namely, that the number of signal samples must not be less than twice the signal bandwidth in accordance with the Nyquist criterion. This ensures that the sampling rate is adequately high to accommodate the highest frequency components of the data, thereby to avoid distortion of a resulting image by Moire fringes. The foregoing requirement is met by first limiting the bandwidth of the signal with a low pass filter, prior to the decimation, to insure that the bandwidth does not exceed the maximum bandwidth allowed by the sampling rate. Herein, in the processing of video signals in the spatial domain, the sampling rate is the number of samples per inch or other unit of spatial measure. The decimation process scales both the frequency content and the sample content by the same factor so that, by meeting the Nyquist criterion prior to the decimation, the Nyquist criterion is automatically met subsequent to the decimation process.

The decimation process is conducted in the frequency domain by performing a DCT of the data to obtain a frequency coefficient matrix wherein the higher frequency terms of both rows and columns are deleted or, when zero-padding is desired, may be set equal to zero. Deletion of the higher frequency rows and columns produces a reduced-size frequency coefficient matrix. The inverse transformation is performed using an inverse transform matrix equal in size to the reduced-size frequency coefficient matrix. In the case wherein zero-padding is desired to increase the size of the matrix to match the matrix to the hardware of the array processor, additional rows and columns of zeros may be annexed to the inverse transform matrix at the higher frequency locations. In the case where zero-padding is employed, additional terms appear in the frequency coefficient matrix, in the case of the forward transform, and in the data sample matrix, in the case of the inverse transform; such additional zero terms are meaningless, and are discarded. There results a transform of a block of data having both a lower spectral content and a reduced number of sample points. For example, an original data matrix having an eight-by-eight array of data points may be converted to a decimated data matrix having a six-by-six array of data points.

The sharpening function is a form of filtering which can be accomplished in the spatial domain by convolving a series of data points with a filter kernel. However, in order to make use of DCT circuitry, the invention provides for the accomplishment of the convolution by a multiplication in the frequency domain. In accordance with an aspect of the invention, the kernel in the spatial domain is less than or equal to the size of a block of the data. First, the kernel (for example, a two dimensional kernel) must be modified by deletion of certain terms in which only half the kernel in the lower right corner of the kernel matrix is retained. If there be an odd number of terms in the kernel, the middle term is also retained. The field of data is partitioned into blocks, and the DECT of a block of data is multiplied by the DOCT of the modified filter kernel, in the case wherein the kernel is symmetric in the spatial domain. However, in the case wherein the kernel is anti symmetric in the spatial domain, the DECT of a block of data is multiplied by the DST of the modified filter kernel. Zero-padding is employed to equalize the size of the kernel matrix to the block of data sample points.

Thereupon, the DECT of the data is formed by use of a DECT transform matrix, and the DOCT (or DST) of the kernel is formed by use of a DOCT (or DST) transform matrix. The DECT and the DOCT (or DST) are multiplied together by means of the dot (scalar) product, this being followed by an inverse transformation to regain a set of data points. This would complete the convolution in the situation wherein the size of the block of data is equal to the size of the array of image points. However, it is recognized that in a typical two-dimensional array of image data, there may be hundreds of image points in each row of data and hundreds of image points in each column of data, with a corresponding number of frequency terms in the frequency-transform domain. It is recognized also that the circuitry of an existing JPEG system may be designed for processing a block of frequency terms in which each row and each column has, for example, eight terms or sixteen terms. In order to perform the convolution with a transform of blocks of data smaller than the array of image points, the mathematical process of convolution requires an additional procedure of an overlapping of data blocks to attain a resultant array of data points which is the mathematical equivalent of the convolution of the entire array of image points. The overlap procedure is explained hereinafter in greater detail, and results in an image which is free of outlines of the blocks. Overlapping is accomplished in both horizontal and vertical directions along the array of image points for a five-by-five kernel and contiguous blocks of eight-by-eight data points. With respect to contiguous blocks of eight-by-eight data points in tho horizontal direction of the image, a swath of four overlapping columns is provided, with two of the columns on the left side of the interface going to the data block on the left and the remaining two columns of tho overlap going to the data block on the right of the interface. A similar overlap procedure is employed in the vertical direction of the image with a horizontal swath of four rows at the interfaces. The upper two rows of the swath go to the upper data block, and the lower two rows of the swath go to the lower data block. The width of the swath for the square data block depends on the size of the kernel in the spatial domain. For an odd number of kernel points in a row or column, deduct one kernel point for determination of the swath width. The invention provides a procedure for accomplishing the foregoing overlap on a block-by-block basis in which specific pixels are selected in each of a succession of sets of pixels to provide the overlapping blocks.

The foregoing example of convolution with eight-by-eight blocks of data is suitable for use in array-processing hardware configured for handling an eight-by-eight matrix. Greater efficiency, in terms of reduced processing time, can be attained by employing hardware configured for a larger matrix, such as a sixteen-by-sixteen matrix, in which case the frequency transform (DCT) of sixteen-by-sixteen blocks of data is employed.

For the interpolation, the two dimensional block of pixels may be configured as a square array or a rectangular array of pixels, and is transformed to the frequency domain by means of the DCT. The array of frequency components of the DCT is enlarged by the emplacement of zeros in additional rows and/or additional columns of the array at the locations of the highest frequency components. By means of the zero padding, the matrix of frequency components is enlarged without any increase in the maximum value of frequency in the DCT. Since the number of frequency terms in the DCT is equal to the number of data points in the array of pixels, upon performing the inverse transform, there is attained an array of pixels which is numerically larger in terms of the number of pixels than the original array. For example, an original eight-by-eight data matrix is transformed to an eight-by-eight DCT matrix. Then, by zero padding, the eight-by-eight DCT matrix is converted to an enlarged ten-by-ten DCT matrix. Inverse transformation is accomplished by using a specifically modified form (as will be described hereinafter) of inverse transform matrix equal in size to the enlarged DCT matrix, in this example, a ten-by-ten inverse transform matrix.

The inverse transformation can be accomplished by use of array processing circuitry configured for processing a ten-by-ten matrix, if such ten-by-ten hardware is available. However, as a practical matter, the hardware is configured for a four-by-four matrix, or an eight-by-eight matrix, or a sixteen-by-sixteen matrix, by way of example. Thus the sixteen-by-sixteen matrix is to be employed. In order to accomplish the inverse transformation with sixteen-by-sixteen hardware, the foregoing ten-by-ten matrix of frequency terms and the foregoing ten-by-ten inverse-transform matrix are to be padded each with six additional columns of zeros and six additional rows of zeros at the locations of the higher frequency terms. Upon performance of the inverse transform, there results sixteen-by-sixteen matrix comprising a ten-by-ten data-sample submatrix at the lower-numbered cell locations (the upper left corner) plus six columns of surplus zeros (at the right side) plus six rows of surplus zeros (at the bottom). The rows and the columns of the excess zeros are discarded.

Thus, the procedure for the interpolation has provided more data points without affecting the frequency content of the image. Scaling by different factors in the horizontal and the vertical directions can be attained by employing a different amount of zero padding in the rows and in the columns. Thereby, the array of pixels of the original data can be altered to match the array of pixels in a display for presentation of the image.

In a particular embodiment of the invention, decimation and interpolation of two dimensional image data are accomplished by a simplified process whereby a set of modified discrete transform coefficients is employed in a discrete cosine processor to produce a matrix of modified frequency components of the data. These are thereafter processed in an inverse discrete cosine processor with modified inverse transform coefficients to produce a reconstructed set of image data. Scaling is accomplished by appropriate zero padding of the modified coefficient sets or the data set.

In another embodiment, sharpening is accomplished by performing a transform of the data to the frequency domain by a DCT, multiplying the transformed data by an appropriate or DST form of the filter kernel and performing an inverse transform to recover a set of sharpened image data.

BRIEF DESCRIPTION OF THE DRAWING

The aforementioned aspects and other features of the invention are explained in the following description, taken in connection with the accompanying drawing wherein.

DETAILED DESCRIPTION OF THE INVENTION

Figure 1:
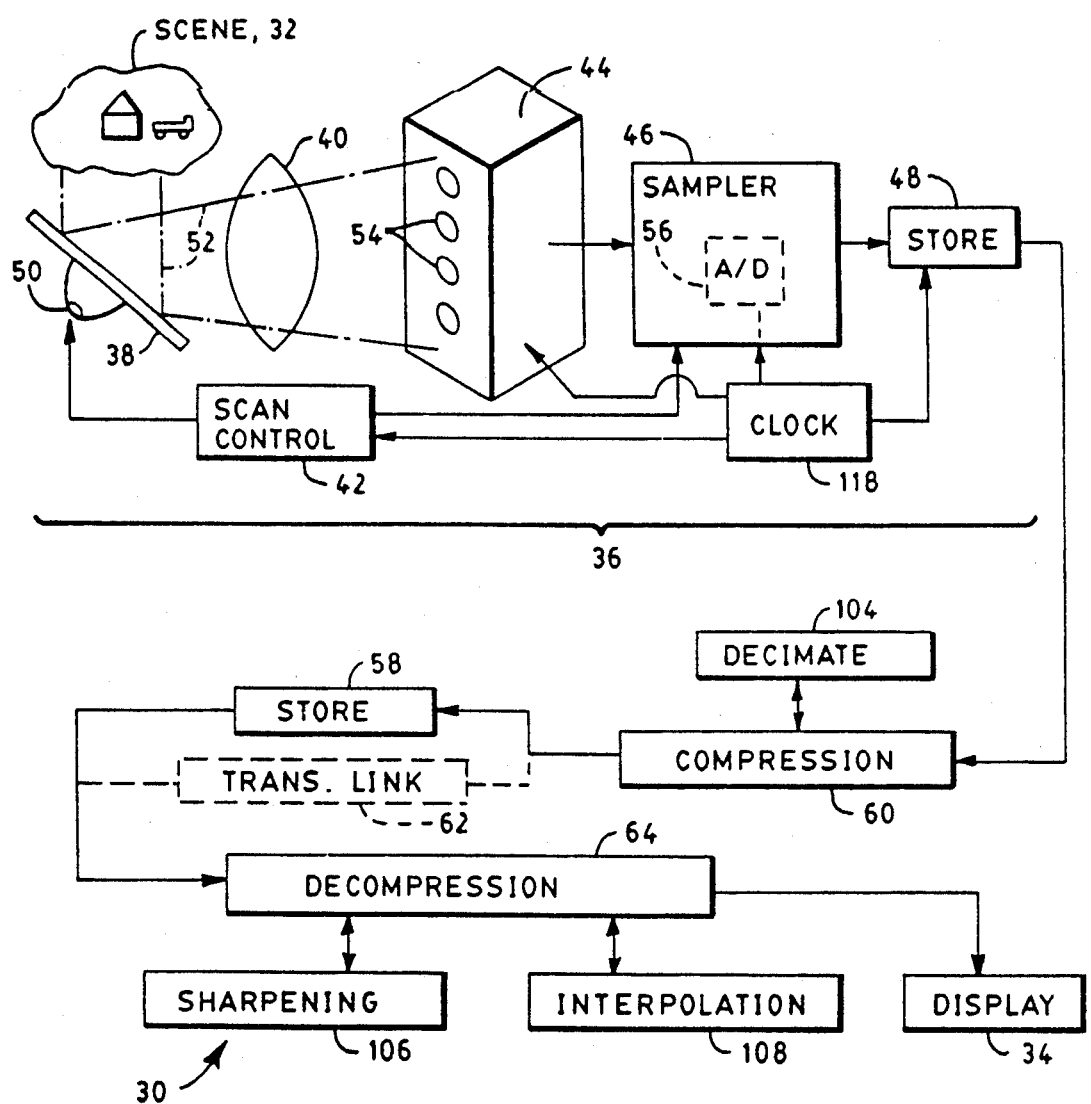
FIG. 1 is a schematic block diagram of an imaging system including components of the invention.
Figure 2:
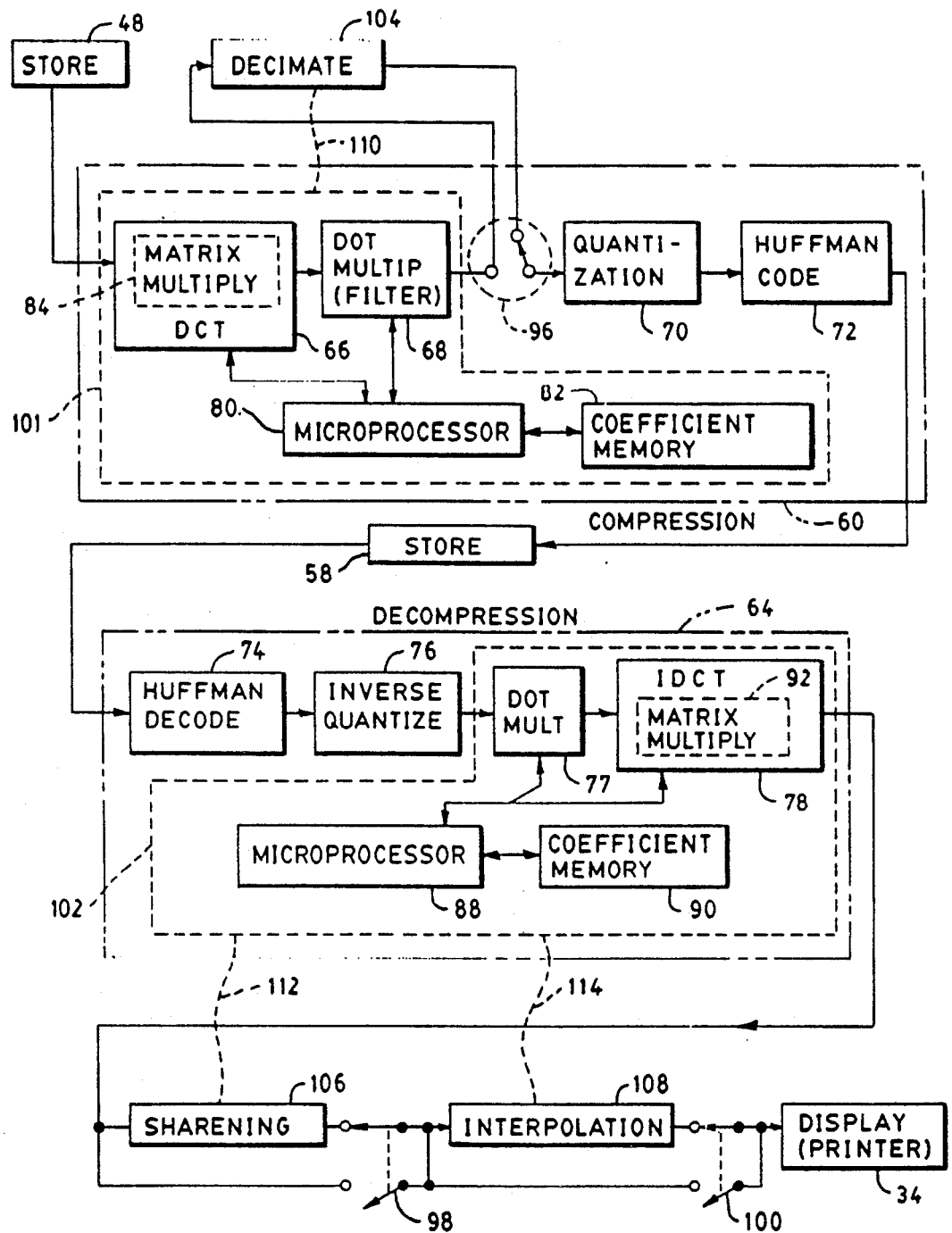
FIG. 2 is a schematic block diagram showing details of data compression and data decompression of the invention.

FIGS. 1 and 2 together show a system 30 for presenting an image of a scene 32 upon a display 34. The display 34 is a printer which prints out the imaging data point by point and, preferably, provides a gray-scale or color representation of each pixel. Alteratively, the display 34 may be a CRT (cathode ray tube) or LED (light-emitting diode) display. Image data of the scone 32 is gathered by means of an optical scanner 36 which comprises a scanning mirror 38, a lens 40, a scan controller 42, a CCD (charged coupled device) array detector 44, a sampler 46 and a storage unit 48. The scanner 36 is provided by way of example for acquiring image data by either the scanning of a single line array or by a two-dimensional array of photodetectors, it being understood that the data may be obtained by a scanning of a photographic slide of the scene 32 as well as from an image produced by a television vidicon.

In operation, individual elements or cells of the detector 44 detect rays of radiation emanating from the scene 32, the radiation being in the infrared or visible portion of the electromagnetic spectrum, by way of example. The controller 42 drives the mirror 38 in a pivoting movement about an axis 50 for reflecting rays 52 of the scene radiation through tho lens 40 upon a face of the detector 44. The lens 40 focuses the radiation upon the face of the detector 44. Pivoting of the mirror 38 provides for a scanning of the radiation along the face of the detector 44 to provide a set of line scans of the scene 22, wherein each cell 54 of the detector 44 views a scanned line of the scene 32. Each cell 54 outputs an analog electric signal in response to detection of the incident radiation, the amplitude of the signal increasing with increasing intensity of the incident radiation. The cells 54 are arranged in a single line along the face of the detector 44 in the scanner 36, the line being perpendicular to the plane of scanning. If desired, the optical scanner 36 can be replaced with a CCD camera (not shown) in which the CCD cells 54 are arranged in a two dimensional array of rows and columns to permit a gathering of scene data without need for the scanning mirror 38.

The sampler 46 is driven by the controller 42 in synchronism with the scanning movement of the mirror 38 to sample the signals outputted by the detector cells 54. The sampler 46 includes an analog-to-digital converter 56 which converts the analog signals of the detector cells 54 to digitized data samples of an image of the scene 32. The digitized samples are outputted by the sampler 46 to the storage unit 48 for storage therein. The data samples stored in the storage unit 48 may be referred to as raw data to distinguish the data from subsequent processing of the data, such as by decimation, interpolation, and sharpening.

Prior to the displaying of the data on the display 34, in the practice of the invention, it is contemplated that the data is to be compressed in a fashion which facilitates data storage and/or transmission. The data storage is of particular interest in that it permits the storage of data in a storage unit 58 which may comprise a magnetic or an optical disk or even be in the form of a solid state read-only memory, all of which can be configured in the form of a card which may be carried in a persons pocket. Thereby, image data which normally may be stored as a photograph, may be stored on a card by practice of the invention.

By way of example in the practice of the invention, the digitized samples from the storage unit 48 are compressed by a JPEG (or MPEG) data compression section 60, prior to storage of the data in the storage unit 58. It is noted that the invention can be practiced also with a transmission link 62, indicated in phantom, should it be desirable to transmit electronically data from the scanner 36 to the display 34, in which case the data compression would facilitate the transmission. The transmission link 62 may be a telephone circuit, a satellite communication link or other suitable form of communication system. The system 30 further comprises a JPEG (or MPEG) data decompression section 64 connected between an output terminal of the storage unit 58 (or of the link 62) and the display 34.

The compression section 60 is constructed in accordance with well-known components of a JPEG compression system and includes a transformer 66 (FIG. 2) providing a forward discrete cosine transformation (DCT) of a set of signal samples into a set of frequency components, a multiplier 68 which operates to form the dot product of two matrices and serves to provide the function of a modified digital filter 68 which limits the bandwidth of a signal propagating through the compression section 60, a quantizer 70 which limits the number of bits per digital word describing a signal sample, and a coder 72 which encodes the signal samples by means of a Huffman code for efficient transmission of data through the compression section 60. The decompression section 64 is constructed in accordance with well-known components of a JPEG compression system and includes the same basic components present in the compression section 60. The selection of function of compression or decompression is accomplished by the use of software and an appropriate choice of transform coefficients for operating the forward or inverse DCT. If the display 34 and the scanner 36 are located at the same site, then the hardware of the compressor section 60 can be employed also for decompressing data stored in the storage unit 58 in preparation for presentation on the display 34.

To facilitate the description of the invention, the compression section 60 and the decompression section 64 are shown separately. The decompression section 64 comprises a decoder 74 which decodes the Huffman coding of the signal samples to regain the signal samples, an inverse quantizer 76 which employs multiplicative factors to restore the number of bits per digital word describing a signal sample, a dot-product multiplier 77, and a transformer 78 providing an inverse discrete cosine transformation (IDCT) of the signal samples from the frequency domain back to the time domain. The multiplier 77 provides no function in the decompression process and may be regarded as being transparent to signals flowing through the decompression section 64; however, as will be described hereinafter, the multiplier 77 is useful in providing an important function of the invention.

The filter function of the multiplier 68 is referred to as a modified filter because it employs a visibility matrix in which higher frequency components are divided by scale factors to reduce the spectral content of the signal, and whereby each block is treated independently with no overlap in contradistinction to a true filter (or convolution circuit). The term visibility is employed because the modified form of filtering has proven adequate for viewing a display of the image. For example, the visibility matrices may be employed with signal channels carrying color data to match the data spectrum to the needs of the human eye. The modified filter is employed in a JPEG compression system to simplify construction, and because the modified filter provides generally adequate results for television. However, in the case of high compression such as approximately 10 to 1 or greater, the image quality is not adequate for the high-quality images associated with hard copy, such as a photograph of the scene 32, because the use of the visibility matrix in the filter 68 leaves an undesirable effect in that the resulting hard copy has block images which should be smoothed at the interfaces to remove artifacts when a higher quality image is desired. The blocks arise from the JPEG processing of image data in the form of data blocks of image data, such as a square array of 64 pixels, with no overlap between blocks.

The compression section 60 further includes a microprocessor 80 operative with a coefficient memory 82 for applying coefficients to a multiplier 84 in circuitry of the transformer 66. The multiplier 84 operates to multiply an array of digital quantities by an array of coefficients to provide matrix multiplication. Similarly, the decompression section 64 further includes a microprocessor 88 operative with a coefficient memory 90 for applying coefficients to a multiplier 92 in circuitry of the transformer 78. The multiplier 92 is constructed in similar fashion to the multiplier 84 for multiplying an array of digital quantities by an array of coefficients to provide matrix multiplication. The microprocessor 88 also includes an input device 94 such as a keyboard or disk drive for the entry of instructions and data such as a set of coefficients for the production of the inverse discrete cosine transform.

In accordance with the invention, the imaging system 30 includes three switches 96, 98 and 100 which facilitate use of the invention in a manner to be described. Also, it is convenient to group certain elements of the compression section 60 into a group 101 and certain elements of the decompression section 64 into a group 102. The group 101 comprises the transformer 66, the multiplier 68, the microprocessor 80, the memory 82 and the input device 84. The group 102 comprises the transformer 78, the multiplier 77, the microprocessor 88, the memory 90 and the input device 94. The imaging system 30 further comprises three component units of the invention which may be used individually or in combination with each other, these component units being a decimation unit 104, a sharpening unit 106 and an interpolation unit 108. The component units 104, 106 and 108 operate with array multiplication such as an array of signal samples by a set of coefficients in a matrix multiplication and/or dot-product multiplication such as the multiplication of the multipliers 68, 77, 84 and 92. Each of the component units 104, 106 and 108 can be constructed as a stand-alone unit fully equipped with all necessary transformation and multiplication circuitry to perform its function or, alternatively, can share necessary transformation and multiplication circuitry already present in the JPEG (MPEG) compression and decompression sections 60 and 64.

A feature of the invention provides for a substantial savings in equipment by sharing the elements of the group 101 between operations of the compression section 60 and the decimation unit 104, and by sharing the elements of the group 102 between operations of the decompression section 64 and the sharpening unit 106 and the interpolation unit 108. The sharing of the elements of group 101 with the decimation unit 104 is indicated by a dashed line 110. The sharing of the elements of group 102 with the sharpening unit 106 is indicated by a dashed line 112. The sharing of the elements of group 102 with the interpolation unit 108 is indicated by a dashed line 114.

The decimation unit 104, the sharpening unit 106 and the interpolation unit 108 may be used in concert with the JPEG compression/decompression sections, or separately from the JPEG compression/decompression sections by means of the switches 96, 98 and 100. The switch 96 provides for connecting the decimation unit 104 serially between the multiplier 68 and the quantizer 70, in one position of the switch 96, and for bypassing the decimation unit 104 in the other position of the switch 96. Similarly, the switches 98 and 100 provide for connecting or bypassing the sharpening unit 106 and the interpolation unit 108 between the transformer 78 and the display 34.

The microprocessor 80, by means of well-known programming employs the multiplier 84 to perform the DCT function for the JPEG compression, and the microprocessor 88, by means of well-known programming employs the multiplier 92 to perform the IDCT function for the JPEG decompression. By means of further programming, to be disclosed hereinafter in accordance with the invention, the elements of group 101 are enabled to operate in the performance of the decimation function, and the elements of group 102 are enabled to operate in the performance of the sharpening and the interpolation functions. Thereby, the invention accomplishes a major objective which is the avoidance of additional equipment for performing the functions of decimation and/or sharpening and/or interpolation by sharing the elements of the groups 101 and 102 with the JPEG compression and decompression functions.

By way of example in the construction of the scanner 36, or the optional CCD camera, the CCD array may employ a thousand cells in the single line of the scanner 36, or a million cells in the two-dimensional array of rows and columns of the camera. The cells provide black and white data in the form of a gray scale representing the intensity of corresponding points of the scene 32. Strips of colored filter material (not shown) may be placed in front of the face of the detector 44 to introduce color to the image. The output voltages of the individual CCD cells 54 may be shifted, in the manner of a shift-register operation under strobing of clock pulses of a clock 118, to output image data serially to the analog-to-digital converter 56. The storing of the digital signals outputted by the converter 56 to the storage unit 48 may be done in interlaced digital data format.

In the case wherein the system 30 processes color, there are three primary colors, namely, red, green, and blue. Each cell 54 provides one pixel of data, and each pixel has a specific color associated therewith, with the intensity of the optical signal being expressed over a range of, for example, 0-255 digital values outputted by the converter 56. Typically, the converter 56 is timeshared among numerous cells 54 of the CCD array.

As is well known, the Huffman code, employed by the coder 72, provides a sequence of code words wherein the words may be of different length. A short-length word is used to describe an item of data which is repeated frequently, and a long-length word is used to describe an item which is infrequent. A short code word has only a few bits but a long code word has more bits. This form of coding, also known as entropy encoding, provides compression of the data transmission. Each word has a start flag and an end flag to designate the beginning and the end of the word.

The density of sampling of image points depends on the smallest item in the scene 32. For example, assuming that one is photographing a barn with a wagon adjacent the barn, the wagon may measure 10 feet which would give a value of 0.1 in corresponding units of spatial frequency. In the scene of the barn and the wagon, the picture of the barn has a much lower frequency content in the absence of the much smaller wagon. Edges of an image of the scene 32 may be blurred to reduce frequency sampling requirements. A reduced number of samples decreases the storage requirements of the storage unit 58 and, in the case of transmission via the link 62, increases the rate at which the image can be transmitted because there are less signals to transmit. It is important that the filter function of the multiplier 68 limit the signal bandwidth so that the spectral content of the scene is not more than half the sampling rate, the Nyquist criterion, because a utilization of scene data with a higher spectral content would produce Moire effects. Low-pass filtering to reduce the higher spectral content of the image may be accomplished digitally by reducing the magnitudes of the higher frequency terms of the DCT. Reduction in the number of samples can be accomplished by use of the decimation process with the DCT upon the stored set of digitized samples of the scene image.

Filtering can be accomplished in the frequency domain and also in the time domain or spatial domain. With respect to filtering in the time domain by convolution, as is done in the prior art, consider an image of the scene 32 and a filter kernel in the form of a small square frame superposed upon a part of the scene for example, a portion of the scene measuring 8 pixels by 8 pixels. Now assume that the frame encloses multiplicative factors wherein there is one factor for each of the 64 pixels enclosed by the frame. The frame with its multiplicative factors constitutes the filter kernel. A convolution of the scene with the filter kernel is of interest. The convolution of the scene with the filter kernel is accomplished by moving the kernel in the direction of the rows, one column of pixels at a time, and by multiplying all of the pixels by their respective factors and summing the products at each of the successive positions of the frame. At each position of the frame, or the filter kernel, the performance of the multiplications followed by the summation of tho products produces one point in the graph of the convolution function. As is well known, convolution with a filter kernel which is the delta function produces a convolution which equals the original scene. The form of the convolution is similar to that of the data of the scene except for modifications thereof associated with the choice of coefficients in the kernel resulting in a filtered view of the scene.

In the practice of the invention, the DCT is employed with blocks or arrays of data points, such as an 8 by 8 array of 64 data points or a 16 by 16 array of 256 data points. The DCT behaves better at interfaces and introduces much smaller discontinuities at such interfaces than does the FFT (fast Fourier transform). The DCT is very fast, and can process the entire array of image points in substantially less than 0.1 seconds. In fact, this is faster than the operation of a frame buffer, such as the storage unit 48, which stores the array of data. The DCT is linear. The great speed of the DCT also facilitates the sharing of the elements of the groups 101 and 102 with the functions of decimation, sharpening, and interpolation without excessive delays in signal processing time.

A knowledge of the mathematical basis of the invention is useful for understanding the invention. The DCT and the FFT may be compared by considering the processing of a block of data points at positions $0 \leq x \leq L$ in a region extending over a distance L by both the FFT and the DCT. The region x/L extends over $2\pi$ radians in the kernel of the FFT, but only over $1\pi$ radians in the kernel of the DCT. In the FET, the mathematical expression is complex and gives only one-half as many frequency components as would be obtained in the DCT. In the case of the region of the DCT, the mathematical terms are real only. There are only a magnitude and a sign which is negative or positive; there is no phase angle. But there are twice as many frequency components as is obtained in the FFT. In the DCT, there are frequency components at 0.5, 1.0, 1.5, 2.0, 2.5 ... cycles. Thus, the DCT components occur at off-integral values of frequency. In forming the DCT of a block of data points, the number of frequency terms in the DCT is equal to the number of data terms.

The one dimensional DCT, $D=\{d_i\}$, of an n point sequence $s=\{s_i\}$ for $0 \leq i \leq (N-1)$ is given by the vector equation $D=AS$ where the transform matrix $a=\{a_{ij}\}$ is given by:

$$a_{ij} = \sqrt{\frac{2}{N}} \; c(j) \cos\left[\frac{(2i+1)}{2N} j\pi\right]$$

where i,j = 0, 1, ... N−1

$$c(j) = \frac{1}{\sqrt{2}} \text{ for } j = 0$$

$$c(j) = 1 \text{ for } j = 1, \ldots N-1.$$

The corresponding expression for the discrete odd cosine transform is given by:

$$a_{ij} = \sqrt{\frac{2}{N}} \; c(j) \cos\left[\frac{(ij\pi)}{N}\right]$$

Similarly, the IDCT may be used to recover the data from the coefficients of the transform matrix by the matrix relationship $$S = A^{-1}D = BD$$

It is noted that in the DCT, the inverse of the A matrix is equal to the transpose of the A matrix, an orthogonal unitary transformation, namely, $$A^{-1} = A^T.$$

An example of an 8-by-8 DCT inverse transform matrix is as follows:

| 1.00 | 1.39  | 1.31  | 1.18  | 1.00  | 0.79  | 0.54  | 0.28  |
|------|-------|-------|-------|-------|-------|-------|-------|
| 1.00 | 1.18  | 0.54  | −0.28 | −1.00 | −1.39 | −1.31 | −0.79 |
| 1.00 | 0.79  | −0.54 | −1.39 | −1.00 | 0.28  | 1.31  | 1.18  |
| 1.00 | 0.28  | −1.31 | −0.79 | 1.00  | 1.18  | −0.54 | −1.39 |
| 1.00 | −0.28 | −1.31 | 0.79  | 1.00  | −1.18 | −0.54 | 1.39  |
| 1.00 | −0.79 | −0.54 | 1.39  | −1.00 | −0.28 | −1.31 | −1.18 |
| 1.00 | −1.19 | 0.54  | 0.28  | −1.00 | 1.39  | −1.31 | 0.79  |
| 1.00 | −1.39 | 1.31  | −1.18 | 1.00  | −0.79 | 0.54  | −0.28 |

In one dimension, the data matrix S, upon taking the inverse DCT transformation, is then given by $$S(i) = \sqrt{\frac{2}{N}} \sum_{j=0}^{N-1} d(j)c(j) \cos\left[\frac{(2i+1)}{2N} j\pi\right]$$

which is then evaluated for integer values of i from 0 to (N−1) to obtain the original data points.

A zero-padded DCT matrix produced in an interpolation process has the following form, by way of example in the case of interpolation in both the horizontal and the vertical directions, namely:

$$\{d_{ij}\} = \begin{bmatrix} D_{ij} & 0 \\ 0 & 0 \end{bmatrix}$$

where $D_{ij}$ represents the terms of the DCT of the data before a zero padding.

For understanding the mathematical basis of decimation and the mathematical basis of interpolation upon which the invention is based, it is important to note that, upon replacing the integer variable, i, by a continuous variable, x, having bounds identical to i, such that $0 \leq x \leq (N-1)$, there is obtained the relationship for the inverse DCT.

$$S(x) = \sqrt{\frac{2}{N}} \sum_{j=0}^{N-1} d(j)c(j) \cos\left[\frac{(2x+1)}{2N} j\pi\right]$$

wherein S(x) is an excellent interpolated continuous function to the original set of data points $\{s(i)\}$. This is in accord with the characteristic of the DCT in providing good compaction, and wherein the DCT provides a robust method for handling boundary conditions for finite sequences.

The foregoing relationship serves as the basis for performance of both the decimation and the interpolation for the following reason. Upon replacing a discrete data set by a continuous function, the function can be evaluated subsequently in as many points as desired. This is subject to the restraints that (1) in order to maintain the Nyquist criterion when down-sampling, there is need to discard frequency components that are higher than the upper limit permitted by the reduced sampling rate, and (2) particularly for interpolation, the range of the continuous variable must not exceed the domain of the original discrete variable, namely, $0 \times (N-1)$. It is advantageous to provide for this relationship in the electrical circuitry (the hardware) so as to facilitate a down-loading of the transform matrix for any level of decimation or interpolation.

A least squares fit to the continuous basis functions above, for a finite discrete set, yields coefficients that are identical to those obtained by performing a discrete cosine transform on the same discrete sequence. This observation is useful because the continuous even cosine transform provides an excellent fit (with practically no oscillation) for a properly sampled signal Interpolation can now be carried out by simply evaluating the continuous fit at arbitrary points and decimation by simply dropping or filtering the aliased frequency components and evaluating the remaining continuous fit at the required number of points.

To facilitate explanation of the processes employed in practicing the invention, it is useful to review certain mathematical operations with matrices. For simplicity in explaining a DCT transformation operation, consider a block of image data expressed as a 4×4 array of pixels. The coefficient A matrix is square and has 16 terms arranged in a 4×4 array of rows and columns. These are labeled $a_{11}, a_{12}, a_{13}, a_{14}$; with the next row being $a_{21}, a_{22}, a_{23}, a_{24}$; the third row being $a_{31}, a_{32}, a_{33}, a_{34}$; and the fourth being $a_{41}, a_{42}, a_{43}, a_{44}$. The subject pixels in the same fashion in the S matrix with the first row being $s_{11}, s_{12}, s_{13}, s_{14}$; with the next row being $s_{21}, s_{22}, s_{23}, s_{24}$; the third row being $s_{31}, s_{32}, s_{33}, s_{34}$; and the fourth being $s_{41}, s_{42}, s_{43}, s_{44}$. The A matrix is used to convert an array of image data points, as set forth in the S matrix, to an array of frequency points of the DCT, as set forth in a D matrix, by multiplying the S matrix by the A matrix to get terms of the cosine transform which are set forth in the D matrix. In the D matrix, the first row is $d_{11}, d_{12}, d_{13}, d_{14}$; with the next row being $d_{21}, d_{22}, d_{23}, d_{24}$; the third row being $d_{31}, d_{32}, d_{33}, d_{34}$; and the fourth being $d_{41}, d_{42}, d_{43}, d_{44}$. The $d_{11}$ term is obtained by multiplying the first row of the S matrix by the first column of the A matrix. In accordance with well-known matrix multiplication, the respective component terms are multiplied to produce products which are summed to give one term of the resultant matrix. The $d_{12}$ term is obtained by multiplying the first row of the S matrix by the second column of the A matrix. The $d_{21}$ term is obtained by multiplying tho second row of tho S matrix by the first column of the A matrix, etc. Each row of the resulting D matrix is referred to as a one-dimensional discrete-cosine transform.

The two dimensional DCT is attained by further mathematical processing, namely, by multiplying the D matrix by the transposed A matrix. (Transposition of the A matrix is attained by flipping the matrix over about its diagonal which extends from the upper left corner to the lower right corner.) The resulting matrix is the two-dimensional DCT, and the terms thereof $d_{11}$–$d_{44}$ are the frequency components of the two-dimensional DCT. In matrix notation $D = ASA^T$.

In the decimation process, provided by the unit 104, the sampling rate of a band-limited signal is decreased by first lowering the frequency content in accordance with the Nyquist criterion. In the interpolation process, also known as resampling, provided by the interpolation unit 108, there is an increase of the sampling rate of the signal without affecting the frequency content of the signal. The filter function of the multiplier 68 may provide for a reduction of the high-frequency spectral content, thus providing reduced transmission bandwidth by reduction of the amplitudes of the high frequency components of the scene image. While this may allow the signal to meet the Nyquist criterion, important for the decimation, this may result in a blurring of edges of objects in the scene, such as the edges of the foregoing wagon. The decimation process itself may result in a blurring of edges of objects in the scene, such as the edges of the foregoing wagon. The sharpening unit 106 counteracts the blurring by enhancing edge lines of a picture, such as edges of the foregoing wagon, by increasing the amplitudes of the high frequency components of the scene image.

The decimation process, whether accomplished by stand-alone circuitry which may be provided for the decimation unit 104 or by a time sharing of the elements of the group 101, can be explained by the same flow chart which will be described hereinafter with reference to FIG. 3. However, it is useful to consider first the following mathematical considerations.

With respect to mathematical considerations of the decimation, the following points are noted. The DCT involves a compilation of basis functions of various orders. If the original image has a high spectral bandwidth, more than double the sampling frequency, Moire aliasing would appear if one were simply to delete sample points from a region of data. Therefore, in the use of decimation to reduce the number of sample points, it is necessary to band limit the data signal to a sufficiently low bandwidth such that no aliasing occurs upon decimation. The requisite reduction in signal bandwidth occurs automatically in the practice of the decimation in accordance with the invention.

A two-dimensional decimation is accomplished by multiplying a matrix of signal samples, the S matrix, by the DCT transform matrix, the A matrix, to obtain the D matrix of frequency terms of DCT of the block of data. It is recalled that the number of frequency terms in the D matrix is equal to the number of data samples in the S matrix. Therefore, a reduction in bandwidth of the signal by removal of high-frequency components of the signal spectrum, as represented by the terms of the D matrix, would produce a reduced number of samples upon performance of the inverse transform. Also, the ratio of bandwidth to the number of samples would be retained, and thereby satisfy the Nyquist criterion during the process of reducing the number of samples. Accordingly, the decimation accomplishes a reduction in the number of terms in the frequency coefficient matrix, in accordance with the practice of the invention, by deleting at least one row and one column of the highest frequency coefficients.

The original block of data is represented now in the frequency domain by a smaller D matrix having fewer frequency terms. Then the IDCT is obtained by matrix multiplication of the smaller frequency coefficient D matrix by an inverse transform B matrix having the same number of terms as the smaller D matrix. There results a block of data samples arranged in an S matrix having fewer samples than the original block of data, the number of data samples being equal to the number of frequency terms in the smaller D matrix. For example, if the original block of image data were represented in an 8 by 8 array of 64 data samples, and if the D matrix were cut back from an 8 by 8 array of 64 frequency terms to a 6 by 6 array of 36 frequency terms, upon taking the inverse DCT, the block of image data is represented by a 6 by 6 array of 36 data samples.

In the JPEG compression system it is the practice to use blocks of data in 8-by-8 arrays of data points, though 16-by-16 arrays also have become available. There is a corresponding coefficient matrix, both A and B matrices, which are 8-by-8 arrays of coefficients. The JPEG circuitry is designed for processing 8-by-8 arrays of data and coefficients with matrix multiplication. To take advantage of existing circuitry, it is desirable, where possible, to practice the invention by use of the 8-by-8 array circuitry already in place in the JPEG compression system. However, certain parts of the invention may employ a smaller array such as a 5-by-5 or a 6-by-6 array. The zero padding presents a useful technique for converting a 6-by-6 matrix, such as an A matrix or B matrix, for use in 8-by-8 array electrical circuitry. The adaptation of the 6-by-6 A matrix for multiplication with a 6-by-6 data matrix by use of 8-by-8 circuitry is accomplished simply by adding additional columns and rows of zeros to produce an 8-by-8 matrix. Such an adaptation may be done also, for example, to accomplish the inverse-cosine transformation of a two-dimensional cosine-transform D matrix of the data by multiplication with the B matrix. Assuming each matrix to be a 6-by-6 matrix, each matrix must be adapted similarly to run in the 8-by-8 electrical circuitry by padding with zeros, namely, by adding additional rows and columns of zeros along the right side and the bottom side of both the original D and B matrices.

The forward DCT can be performed on an electronic array transform processor configured as an 8 by 8 array of 64 cells, and the foregoing inverse DCT can be performed on an electronic array transform processor configured as a 6 by 6 array of 36 cells. However, in the event that the available electronic array transform circuitry for performance of the DCT and the IDCT is configured only as an 8 by 8 array of 64 cells, then, in accordance with a feature of the invention, the smaller D matrix and the smaller B matrix must be enlarged to fit the 8 by 8 configuration of the array processor. This is accomplished by the foregoing zero-padding wherein coefficients of the higher-frequency right-hand column(s) and the corresponding bottom row(s) of the D matrix and of the B matrix are replaced with zeros. The resulting data sample, or S, matrix has numerous excess samples of zero value located in the right hand column(s) and in the bottom row(s). These excess samples are discarded to leave the smaller S matrix which, in the foregoing example, has two less columns and two less rows than the original S matrix.

In a preferred embodiment of the invention, the blocks of subject matter are set forth n eight rows of pixels, with each row having eight pixels. The DCT is accomplished by use of the A matrix having eight rows with each row having eight coefficients. The DCT of a small portion of the image, such as an 8-by 8-array of number to the array of points of the selected pixels. There is one frequency term for each pixel. Therefore in an 8-by-8 array of pixels being transformed by the DCT, there results an 8-by-8 array of frequency terms with each frequency term corresponding in a one-to-one correspondence with the pixels of the selected region.

The interpolation process, whether accomplished by stand-alone circuitry which may be provided for the interpolation unit 108 or by a time sharing of the elements of the group 102, can be explained by the same flow chart which will be described hereinafter with reference to FIG. 5. However, it is useful to consider first the following considerations.

Interpolation is useful when an original subject scene is portrayed with a number of data points which differs from the number of data points that is employed in electrical display or printing equipment, such as a dot-matrix printer, a laser printer, an array of light-emitting diodes or an array of liquid-crystal cells. Simply altering the physical sizes, as by stretching of the pixels, does not adapt the set of data pixels for display on the electrical display equipment. In this case, there is a need for a match of the number of pixel points to the number of individual cells in the display equipment. One known way of accomplishing a change in the number of pixels is occasionally to double up a pixel by repeating the value of the pixel in a row or column. However, this produces a discontinuity which is noticeable visually and may be disturbing to a viewer. It is preferable to insert additional pixels, in accordance with a feature of the invention, by means of the DCT wherein the values of the injected pixels as well as the original pixels are adapted so as to produce a smooth continuum of data.

The procedure for interpolation, in accordance with the invention, employs the DCT of an array of data which is to be interpolated and includes modification of the DCT array by the insertion of additional row(s) and/or column(s), and padding the additional row(s) and/or column(s) with zeros. The number of additional rows to be padded is not necessarily equal to the number of additional columns to be padded. There follows inverse transformation by using an inverse transform matrix equal in size to the enlarged DCT matrix, but wherein the inverse transform matrix is modified as will be described hereinafter.

The sharpening process, whether accomplished by stand-alone circuitry which may be provided for the sharpening unit 106 or by a time sharing of the elements of the group 102, can be explained by the same flow chart which will be described hereinafter with reference to FIG. 6. The overlapping process and zero-padding of the filter kernel will be described with reference to FIGS. 7 and 8. However, it is useful to consider first the following mathematical considerations.

In the sharpening unit 106 filtering is accomplished, by way of example in a preferred embodiment of the invention, by use of a 5-by-5 spatial filter kernel to filter data arranged in blocks of eight rows by eight columns. In accordance with the invention, convolution is accomplished by multiplication in the frequency domain employing the DCT by use of a procedure wherein individual ones of the 8-by-8 blocks of data samples are selected, in a manner to be described, to be processed sequentially by the filter kernel. The 5-by-5 matrix of a linear-phase filter kernel is to be reduced, in the spatial domain, to a 3-by-3 array of terms, followed by zero-padding to produce an 8-by-8 modified kernel. This is followed by forming the odd cosine transform (DOCT) of the modified kernel and the even cosine transform (DECT) of each block of the data samples. Next, the DECT of the selected block of data samples is multiplied by the DOCT of the filter kernel by use of the dot product. In the dot product, the term $d_{11}$ of the DECT is multiplied by the term $k_{11}$ of the DOCT of the modified filter kernel. Similarly, the term $d_{12}$ of the transformed data is multiplied by the term $k_{12}$ of the transformed kernel. There results an array of products which represents the dot product of the two transforms. The filtering operation for the single data block is completed by performing the inverse transform of the dot product to regain the spatial or time domain of the data which is now in a partially filtered, or processed, state. The filtering procedure is repeated for each of the other blocks of data samples. The resulting blocks of processed data are then subjected to an overlap procedure as will be explained hereinafter.

In accordance with an aspect of the invention, in the foregoing multiplication of the d terms by the k terms, use is made of both an even and odd form of the DCT, namely, the aforementioned DECT and the DOCT, respectively. Normally, in a filtering operation, a linear phase (even) filter is employed. In the spatial domain, the kernel of a linear-phase filter has symmetry about a central component. The form of the jth basis function of the DOCT is $$\cos(ij\pi/N)$$

where i and j are integers and $0 \leq i \leq (N-1)$ and $0 \leq j \leq (N-1)$.

An understanding of tho use of both tho DOCT and the DECT may be provided further from a mathematical basis upon noting that a graph of the cosine is symmetric about the zero degree, or origin, of the angle axis. Thus, the value of the cosine is the same for both positive and negative values of the argument (the angle). With respect to the filter kernel, the values of the kernel are usually symmetric to provide the linear phase filter. For example, considering a row of five terms of the kernel in the spatial domain, in one dimension by way of example, the central (or third) term may have a value of five, the second and fourth terms may each have a value of three, and the first and the fifth terms may each have a value of one. Only three of the foregoing five terms are to be employed in forming the DOCT, namely, the third, the fourth, and the fifth terms of the row of five terms.

Before forming the DOCT for operation with cosine transforms of eight-point blocks of data, in the one-dimensional case, the three kernel terms are padded with five additional zeros at the right side of the kernel to give a series of 8 terms. Now, the matrix of the signal samples and the matrix of the kernel terms each have eight terms suitable for being transformed by the DCT to the frequency domain. An eight-point even cosine transform is performed on the data matrix by use of an even A matrix having eight coefficients. An eight-point odd cosine transform is performed on the kernel matrix by use of an odd A transform matrix having eight coefficients. Both forms of the A transform matrix are well known.

Figure 8:
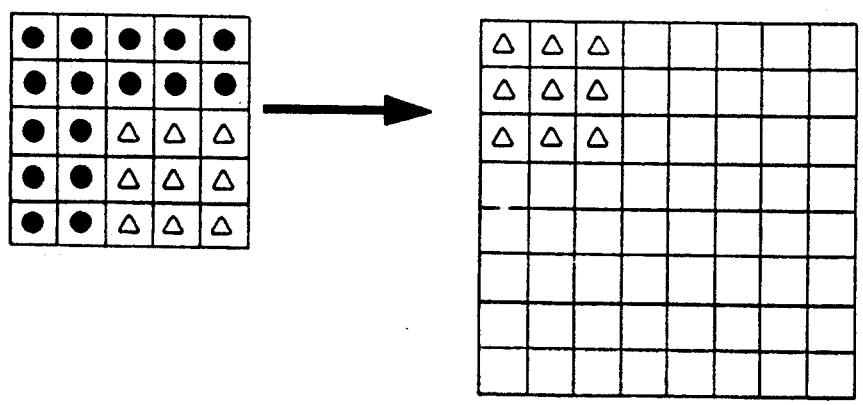
FIG. 8 illustrates the conversion of a linear-phase filter kernel from a 25 cell array to a 64 cell array.

The two-dimensional odd cosine transform of the filter kernel is performed in a manner analogous to the foregoing DOCT of one-dimensional case. The kernel in the spatial domain has 25 terms arranged in a 5-by-5 matrix. Prior to forming the DOCT of the kernel, a submatrix of nine terms in the lower right corner is formed, the submatrix consisting of the last three terms of the third row, last three terms of the fourth row, and last three terms of the fifth row, as is shown in FIG. 8. The submatrix is expanded by zero-padding into an 8-by-8 matrix wherein the submatrix is located in the upper left corner of the 8-by-8 matrix, and the fourth through eighth columns are filled with zeros, and the fourth through eighth rows are filled with zeros. Thereupon, the odd cosine transform of the expanded kernel matrix is formed by use of an odd, 8-by-8 A matrix of 64 coefficients. In this two dimensional case, the data samples are provided also in 8-by-8 matrices, and an even cosine transform of a data matrix is formed by use of an even, 8-by-8 A matrix of 64 coefficients. The resulting two 8-by-8 matrices of frequency terms are multiplied together by the dot product to form an 8-by-8 matrix of 64 frequency-domain terms. The later matrix then is transformed back to the spatial domain by use of an inverse transform B matrix configured as an 8-by-8 matrix of inverse transform coefficients.

The foregoing sharpening is a form of filtering to emphasize certain frequencies at the high end of a truncated frequency spectrum. This can be done by convolution in the spatial domain, as in the prior art, wherein the kernel is the impulse response of a sharpening filter or, in the practice of the invention, by use of multiplication in the frequency domain. With respect to the foregoing scene of the barn and the wagon, emphasis of high frequencies at the middle of the foregoing scene is not required, but need be used only at the edge of the barn or wagon. Typically, the lower coefficients are non-zero, and only the higher frequency coefficients need be modified because the higher frequency portion of the spectrum provides the detail in the image.

The entire region of the subject is too large to transform as a single block of samples and, accordingly, the subject region is split into many manageable sized subject blocks of eight by eight pixels. The image is attained, as noted above, by overlapping data samples in the transformation process. The overlapping results in more blocks of data to be transformed, but this is compensated by discarding extra samples from each block of the reconstructed image, the extra samples coming from both sides of each interface at the abutments of contiguous data blocks. The overlapping can be accomplished with a microprocessor either by programming an addressing apparatus of an input buffer store to extract overlapping sequences of pixels, or by introducing shift registers with feed-forward paths to input data in the requisite overlapping sequence.

A convolution of the scene with the filter kernel can produce a variety of effects on edge regions of the scene depending on the nature of the filter coefficients. In the case wherein the filter kernel is, by way of example, an array of 5 pixels by 5 pixels, and wherein only the central nine coefficients have significant multiplicative factors, and the outer border of 16 coefficients are close to unity, only the nine central coefficents of the two-dimensional array of filter coefficients are significant. The effect of the filter kernel at each location of the kernel during a convolution, in the spatial domain, extends over a region of tho scene having an extent of approximately 3 pixels in each dimension. In the case of a filter intended for sharpening of an image, the effect of the filter is to operate on a ramp function of an edge region to make the ramp steeper. However, with the foregoing example of filter kernel, this occurs primarily for ramps of edge regions having a width on the order of approximately 3 pixels. A scene composed of a black and white image with varying gradations of light is assumed.

Consider a portion of the image wherein the intensity of the light varies gradually in the form of a long ramp of considerable extent, for example, 50 pixels. It is clear that the multiplication by the kernel factors plus the summation of the resultant products will do little more than act as a scaling of the ramp without making a significant difference in its duration. Thus, the filter of the foregoing example affects short duration portions of the subject without effecting long duration portions of the subject. Accordingly, the described filter is a high pass filter. If the filter kernel were extended over a region of 50 pixels, then the coefficients, or multiplicative factors, within the filter kernel could be selected in a variety of ways to produce either a high pass, a low pass, or a bandpass filter.

In the case of actual subject matter to be considered, and in case of an imaging system to be employed, the pixel is assumed to be rectangular or square with a size in a range of 80 microns to 120 microns along a side of the pixel. Taking an average value of pixel to be 100 microns on a side, there would be 10 pixels per millimeter. There is an interest in the sharpening of the portion of an image in the region of two to three cycles per millimeter. Such a spatial duration is equal to two to three pixels for a pixel size of 100 microns. The preferred embodiment of the invention employs the aforementioned filter kernel measuring 5 pixels by 5 pixels with one or more of the central nine filter coefficients having larger amplitudes than the other coefficients. The effective length of the kernel, in this example, is substantially equal to the region to be sharpened. The use of the additional filter coefficients at the perimeter of the filter kernel provides additional smoothing in the operation of the filter.

If the filter kernel were padded to be the same size as the total scene, then the result of the preceding convolution operation would be a fully filtered, or sharpened, or enhanced rendition of the scene, only if the convolution is performed by multiplication in the frequency domain. Therefore, the foregoing procedure is applied with a relatively small kernel possibly an 8-by-8 kernel, by means of operation in the frequency domain, to produce the enhancement of a correspondingly small region of the scene. Thereafter, the filter kernel is moved, as a step of the convolution process, to an adjacent overlapping data block of the scene, and the process is repeated to filter the scene by a succession of filtering operations wherein the scene is filtered piecemeal. In view of the piecemeal processing, it is necessary to employ the aforementioned overlap procedure to obtain the mathematical equivalent of convolution with equal sized matrices of data and kernel. The overlap serves also to remove deleterious effects of the piecewise implementation.

The overlapping in the convolution process is accomplished as follows, and may be demonstrated with the use of an image divided into 8 by 8 arrays of pixels. For simplicity, consider first a one dimensional array consisting of only the first row of pixels in the foregoing array. The foregoing transform procedure is employed, including the zero-padding of the kernel, the dot product of the data DECT and the kernel DOCT, and the inverse transform to obtain 8 terms of processed data samples.

The example of the convolution of the one-dimensional image continues with movement to additional pixel points to the right of the eight-pixel array which has just been filtered by use of the DCT. Now, the overlap comes into play. The next set of eight points includes the four points to the right of center of the original eight-point set, plus four additional points. This gives a total overlap of four points of which two points are associated with the set of points to the left and two points are associated with the set of points to the right. The four point overlap is based on the size of the filter kernel. A kernel extending over four or five pixels requires a four pixel overlap. There is a repetition of the foregoing sequence of steps involving the even and odd cosine transforms followed by the dot product and the inverse transform to get a filtered set of eight points.

In this example, the points 5, 6, 7, and 8 appear in the right half of the first filtered set of points and in the left half of the second set of filtered points. The points 5 and 6 are retained in the first filtered set of points and discarded from the second filtered set of points. The points 7 and 8 are discarded from the first filtered set of points and retained in the second filtered set of points. The procedure continues for filtering the next set of pixel data points, the next set, including the overlap, being points 9, 10, 11, 12, 13, 14, 15, and 16. Again, upon utilization of the odd and even cosine transforms with the dot product followed by the inverse transform, there is provided a third set of filtered data points. Here too, there is a total overlap of 4 points. In the overlap, the first two points, namely, points 9 and 10 are retained in the second filtered set of points and are discarded from the third set of filtered points while the following two points, namely, the points 11 and 12 are discarded from the second filtered set of points but are retained in the third filtered set of points.

By use of the foregoing overlap procedure, the overlap in the case of the two-dimensional discrete cosine transform can now be explained by way of further example. The example is the 8-by-8 square array of pixel data points, this being similar to the 16-by-16 array in FIG. 7. First, obtain the DECT of the entire 8-by-8 matrix by multiplication with a square DECT coefficient matrix employing matrix multiplication, in accordance with the multiplication procedures described above. The procedure continues until all eight rows of the data matrix have been processed to provide all eight rows of an intermediary matrix. Then there follows a further matrix multiplication in which the intermediary matrix is multiplied by the transposed version of the DECT transform matrix utilizing matrix multiplication to produce the fully transformed two-dimensional DECT matrix of the data points.

Now, use is made of the two-dimensional filter kernel to accomplish the filtering operation. First, reduce the 25 point kernel to the nine point kernel, and then pad the two-dimensional filter kernel with zeros in both the horizontal and the vertical directions of the array of coefficients to produce an 8 by 8 array of coefficients. The process continues by obtaining the discrete odd cosine transform of the filter kernel by a matrix multiplication of the padded kernel with the 8-by-8 coefficient matrix of the odd cosine transform. As has been described for the production of the two-dimensional cosine transform of the data points, so too, in the two-dimensional cosine transform of the filter kernel, there is a matrix multiplication to produce the intermediary matrix of the filter terms, this being followed by a further matrix multiplication employing the transposed transform matrix of the odd cosine transform to provide the fully transformed two-dimensional filter matrix.

The process continues with multiplication in the frequency domain of the data DECT matrix by the kernel DOCT matrix. This is accomplished by forming the dot product of the two matrices to produce a set of 64 products. This is followed by the two-dimensional inverse DCT by multiplication of tho dot-product matrix by the coefficient matrix of the inverse cosine transform, this multiplication being a matrix multiplication. There results an array of 64 filtered data points.

Now, the overlap of the two-dimensional arrays of data points comes into play. The foregoing procedure for forming the two-dimensional filtered array of data points is repeated for other sets of 64 data points, each set being arranged as a matrix of 8 by 8 data points. The array of data points immediately to the right of the original array overlaps the original array with respect to the four columns at the right of the original array. A subsequent matrix of data points immediately below the original data array overlaps the bottom four rows of the original data array. The overlapping of rows and columns at the interfaces with successive arrays of data points continues with the foregoing format of overlapping. Then, with respect to the discarding of data points, there is a discarding of half of the columns in the swath of four overlapped columns and a discarding of half of the rows in the swath of four overlapped rows. With respect to the discarding of columns, the left half of the columns, (this being the two left columns of the vertical swath) go to the array on the left of the overlap, and the two columns on the right of the overlapped columns go to the data array at the right side of the overlap. Similarly, with respect to the swath of overlapped rows, the two upper rows go to the upper array of data points, and the two lower rows go to the lower array of data points at the interface of the two arrays of data points. The overlapping in combination with filtering by use of a multiplication of odd and even forms of the DCT produces an image with clarity at boundaries of objects in the scene 32, and also inhibits formation in the image of the outline of blocks from the operation of the modified filter 68.

Figure 7:
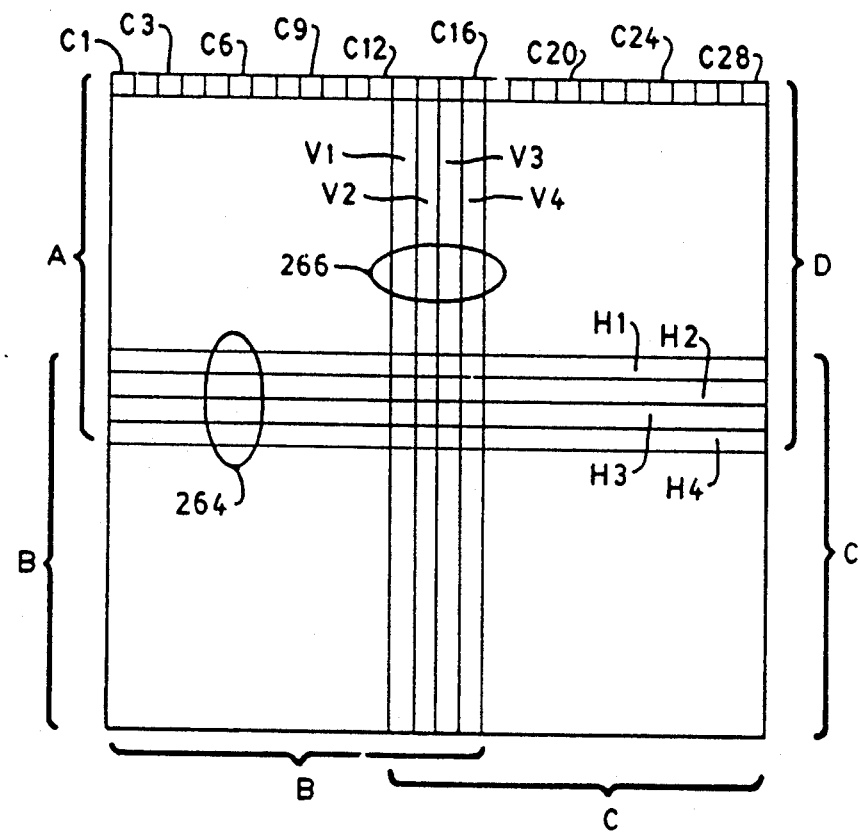
FIG. 7 is a diagram of an overlap of four, two dimensional blocks of data samples wherein each block is a square array of 16 rows and 16 columns of data samples.

It is observed that the present example presumes array transform circuitry configured for processing 8-by-8 matrices with a filter kernel formed as a 5-by-5 matrix of spatial components, in which case there is an overlap at the outer edge of the matrix of data samples of two columns and two rows. This produces a swath of excess pixels along the interface of adjacent matrices having a width of four pixels. In the event that 16-by-16 array transform circuitry were employed with the same filter kernel, then 16-by-16 blocks of data samples would be employed and there would still be a swath of four columns and four rows (FIG. 7). In the case of a kernel matrix having an odd number of rows or columns, deduct one element of the row (column), and take half the remainder as the amount of the overlap.

The following observations are of interest. The question may be raised as to whether it is more efficient in terms of microprocessor manipulations or computations to do the convolution in the time or spatial domain, or in the frequency (DCT) domain. For under ten terms of the filter kernel, it is more efficient to perform the convolution in the time or spatial domain. However, somewhere in the range between 10 and 16 terms of a filter kernel, it becomes more efficient to perform the convolution by use of the frequency domain in the DCT. However, if DCT hardware for processing 8 by 8 pixel arrays is already in place, as is the situation with JPEG compression systems, then it is advantageous to employ the existing DCT hardware rather than constructing additional circuitry to perform the convolution in the time or spatial domain. It is noted also that the fast Fourier transform (FFT) cannot be used for decimation or interpolation in the same manner as use of the DCT, but can be used for image enhancement including convolution for sharpening boundaries of objects in the scene or subject. However, the FFT requires specialized circuitry different from the JPEG circuitry, while the DCT is operative with the JPEG circuitry.

It is also noted that an image can be scaled in one or two dimensions simply by scaling each pixel. For example, a square pixel of an original image can be stretched in one dimension to produce a rectangularly shaped pixel. By doing this to all of the pixels, tho number of pixels stay the same; but the image appears stretched in one dimension. In the matter of interpolation, there is actually a change in the number of pixels in a row and/or column of the pixel array. Similarly, in decimation, there is a change in the number of frequency coefficients actually present in an array of the frequency coefficients. In terms of speed of response of the imaging system 30, and in terms of higher quality rendition of subject matter in an output image, larger blocks of DCT perform better than smaller blocks. An 8-by-8 block of data is preferred, with a 16-by-16 data block being even better.

The foregoing techniques of sharpening, decimation and interpolation are accomplished in a much less expensive fashion by use of a two-dimensional DCT than would be the case if one were to employ two-dimensional processing in the conventional sense without transforming to the cosine frequency domain.

In the preceding description, zero-padding has been described as the placement of additional components of zero value to the right and below original component terms of a matrix, such as components of the filter kernel. This is in accordance with a mathematical convention with matrix notation wherein higher numbered columns are located to the right, and higher numbered rows are located to the bottom of the matrix. A corresponding convention is applied in the description of matrices of frequency components in which the higher frequency components are towards the right and towards the bottom of the matrix in a two-dimensional matrix of frequency components of the DCT. Thus, there is a correspondence between higher numbered locations of an array of terms in the spatial domain which are sites of the zero padding, and the corresponding locations in the frequency domain of the higher-frequency components. It is to be understood, therefore, that the use of descriptive terminology of zero-padding to the right and below a set of terms in a submatrix is in accordance with the foregoing convention, and that the practice of the invention includes some other location of the zero padding with corresponding relocation of terms in other ones of the matrices such as the transform matrices and the frequency-domain matrices. FIG. 3 presents, in schematic block form, process steps for accomplishing frequency domain decimation in accordance with the invention. The description in FIG. 3 is for a two-dimensional ($N_1 \times N_1$) array of data or pixel samples. This arrangement of FIG. 3 covers the process in which decimation is practiced subsequent to the JPEG compression which is briefly described.

As earlier noted with respect to FIG. 2, two dimensional JPEG compression involves a multistep process in which image data in the spatial domain is represented in the form of a matrix of data or pixel values. This data may be transformed into the frequency domain by DCT and thereafter filtered, quantized and encoded to thereby compress it for storage or transmission. Likewise, the data may be reconstructed in the spatial domain by inverse DCT and decompression.

Generally, the process of two dimensional DCT involves arranging pixel values in a spatial $N \times N$ matrix. A set of forward transform coefficients in an $N \times N$ matrix is precomputed and stored in the memory. The data and forward transform coefficients are thereafter matrix multiplied to produce a first $N \times N$ array representing transformation in one dimension. The $N \times N$ result is transposed and again matrix multiplied with the forward transform coefficients to complete the discrete cosine transformation in two dimensions. It should be understood that the transformation is a discrete even cosine transformation. The foregoing steps are repeated in reverse order to reconstruct the transformed data into the spatial domain. In such an arrangement, the discrete cosine transform of the data is matrix multiplied by an $N \times N$ array of inverse transform coefficients to produce a transform in one dimension which is transposed and again matrix multiplied with the inverse transform coefficients to complete the reconstruction or recovery of the data in the spatial domain.

Filtering employs a symmetrical $N \times N$ filter kernel which has been suitably modified by deleting selected top rows and left hand columns and zero-padding the resulting array so that it matches the $N \times N$ array of the data. Thereafter, an odd DCT of the filter kernel is taken. Filtering in the frequency domain occurs when the odd DCT of the kernel is dot multiplied with the DCT of the data. The result is thereafter subjected to an inverse DCT operation to thereby produce a filtered reconstructed matrix of the data in the spatial domain.

In accordance with the invention, image sharpening is a piecewise filtering process performed essentially in the same way that the above described filtering is performed. The filter kernel employed with sharpening is specially designed to enhance certain high intermediate frequency coefficients.

Because sharpening is accomplished in a piecewise manner certain terms from the resulting reconstructed data are deleted. Accordingly, an overlap generator is employed to track the data and to properly discard selected terms in accordance with the degree of overlap which is selected prior to the sharpening operation.

Decimation in accordance with the invention may be achieved in a manner similar to the filtering operation noted above. However, it has been found that a simplified decimation process employs a forward DCT of $N \times N$ data with a set of $N \times N$ forward transform coefficients followed by an inverse DCT with a modified set of inverse transform coefficients in which high frequency components have been set to zero. Thus, decimation occurs without a separate dot multiplication step. Decimation occurs with the overlap set to zero.

Interpolation in accordance with the present invention is also essentially a filtering process in which the image size is enlarged. Interpolation is achieved by selecting an overlap which is the difference between the initial and final size of the data matrix. For example, going from a $5 \times 5$ to an $8 \times 8$ matrix results in an overlap of 3. For interpolation to be practically achieved, the processor has a larger capacity than the data matrix. Accordingly, the data matrix is zero padded up to the size of the processor capacity and a DCT is performed on the data. Thereafter, an inverse DCT is performed on transformed data using a modified set of inverse transform coefficients in an array that matches the desired size of the data to be reconstructed with remaining locations in the matrix of inverse transform coefficients are zero padded out to the limits of the processor capacity. Likewise, the filtering step is automatically achieved without a separate dot multiplication step. The foregoing arrangements are further described hereinafter with respect to FIGS. 3–6 and 9.

DECIMATION

Two dimensional decimation and interpolation filtering is performed on a sequential block by block basis. A decimation filter 120 represented in FIG. 3 using $N_1 \times N_1$ sized blocks, with the final image down sampled to $N_2 \times N_2$ sized blocks. It is of course necessary that the source data be band width limited to prevent aliasing in the decimated image. This prefiltering function is not shown in FIG. 3, but is referred to above in FIG. 2.

The decimation filter 120 performs the following processing steps:

1. The image is partitioned into blocks of size $N_1 \times N_1$. Typical values for $N_1$ are 8 or 16.
2. The blocks are transformed to frequency image samples using the discrete even cosine transform. The transform is computed with appropriate transform coefficients and matrix multiplications.
3. The frequency image matrix is converted back to the spatial domain using modified inverse transform coefficients. These are constructed by replacing the high order rows and columns with zeros of the conventional inverse transform coefficients. The number of rows and columns, thus modified determines the degree of decimation or decimation fraction.
4. The resulting decimated image consists of an $N_2 \times N_2$ matrix with generally non-zero elements. The bottom rows and right columns which are zero are discarded.

Figure 3:
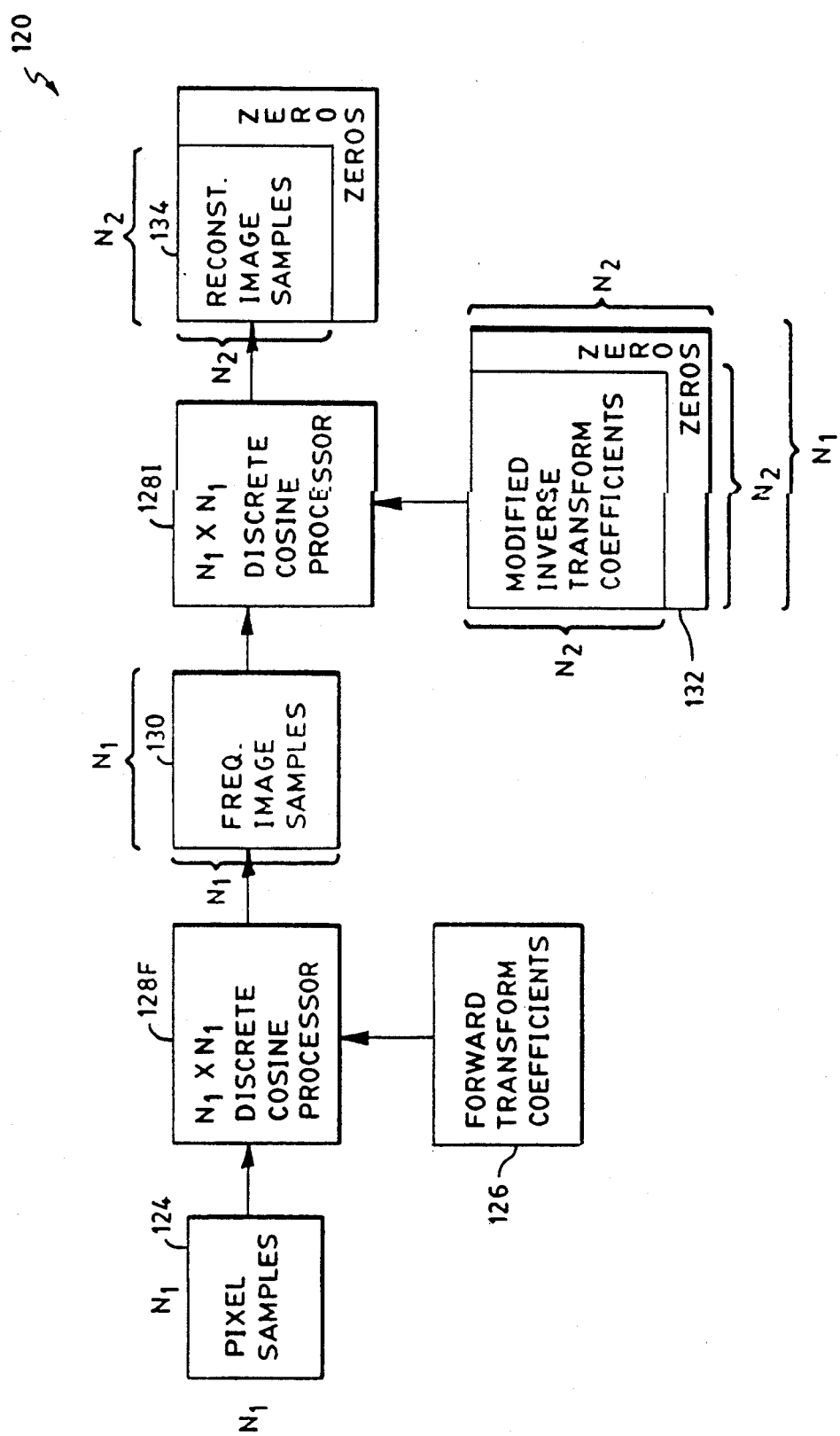
FIG. 3 is a schematic block diagram illustrating the decimation process of the invention.

Referring to FIG. 3, a two-dimension $N_1 \times N_1$ block of filtered data or pixel data is partitioned at block 124. A corresponding block of $N_1 \times N_1$ forward transform coefficients for use in performance of the DCT is stored at block 126. The pixel samples at block 124 and the forward transform coefficients at block 126 are applied to forward discrete cosine processor 128F which performs a forward DCT. The result is an $N_1 \times N_1$ set of frequency image samples in block 130 which represent the frequency components of the transformation.

Decimation is accomplished by deletion of higher frequency components. This is achieved by applying the frequency samples in block 130 to inverse discrete cosine processor 128I which performs an inverse DCT on the frequency samples with a set of $N_1 \times N_1$ modified inverse transfer coefficients from block 132. The discrete cosine processors 128F and 128I are preferably the same processor time shared for operation in forward and inverse modes. The result of the inverse transform is an $N_2 \times N_2$ array of decimated image samples reconstructed in the spatial domain in block 134.

In the invention, the set of $N_1 \times N_1$ modified inverse transform coefficients in block 132 comprises $N_2 \times N_2$ inverse transform coefficients with remaining rows and columns (namely $N_1-N_2$) set to zero. Thus, when it is desired to decimate the image samples or reduce the image an amount, namely $N_1-N_2$, the inverse transform coefficients are modified by setting the high frequency components to zero whereby decimation occurs during the DCT and IDCT processes without an additional filtering step.

The array of $N_2 \times N_2$ reconstructed data samples at block 134 represent the same field of data as do the $N_1 \times N_1$ pixel data at block 124 except that the data is now represented by a lesser number of samples and by a lower frequency spectrum. The fractional reduction in spectrum is equal to the fractional reduction in the number of samples, i.e. $N_1-N_2$. An example of an inverse DCT transform matrix to decimate from 8-by-8 to 6-by-6 is as follows:

| 1.00 | 1.37 | 1.22 | 1.00 | 0.71 | 0.37 | 0.00 | 0.00 |
|------|------|------|------|------|------|------|------|
| 1.00 | 1.00 | 0.00 | −1.00 | −1.41 | −1.00 | 0.00 | 0.00 |
| 1.00 | 0.37 | −1.22 | −1.00 | 0.71 | 1.37 | 0.00 | 0.00 |
| 1.00 | −0.37 | −1.22 | 1.00 | 0.71 | −1.37 | 0.00 | 0.00 |
| 1.00 | −1.00 | 0.00 | 1.00 | −1.41 | 1.00 | 0.00 | 0.00 |
| 1.00 | −1.37 | 1.22 | −1.00 | 0.71 | −0.37 | 0.00 | 0.00 |
| 0.00 | 0.00 | 0.00 | 0.00 | 0.00 | 0.00 | 0.00 | 0.00 |
| 0.00 | 0.00 | 0.00 | 0.00 | 0.00 | 0.00 | 0.00 | 0.00 |

1. In this description, it is presumed that there are $N_1$ locations of cells in the array of the processor 128. However, it may be desirable to there are N processor having an array of locations of cells greater than the $N_1$. In such case, the invention provides for an accommodation of the size of the array of matrix terms to the physical size of the processor. In the case of an oversized processor 128, e.g. $N_3 \times N_3$ where $N_3 > N_1$, each matrix is zero padded to the size of the processor. An example of such accommodation is hereinafter more conveniently and relevantly described below with respect to interpolation.

Figure 4:
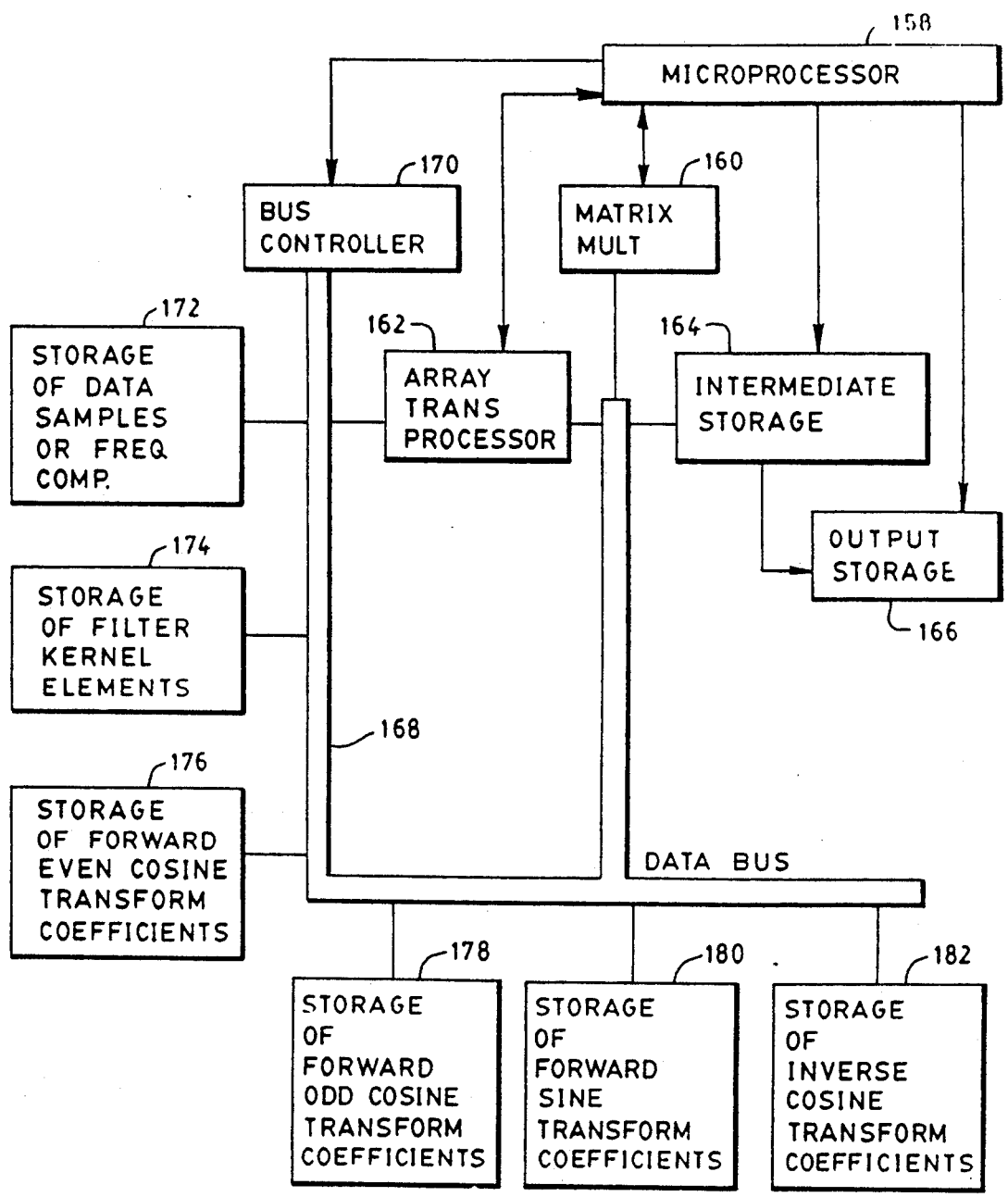
FIG. 4 is a schematic block diagram illustrating a hardware implementation suitable for carrying out the process illustrated in FIG. 3.
Figure 5:
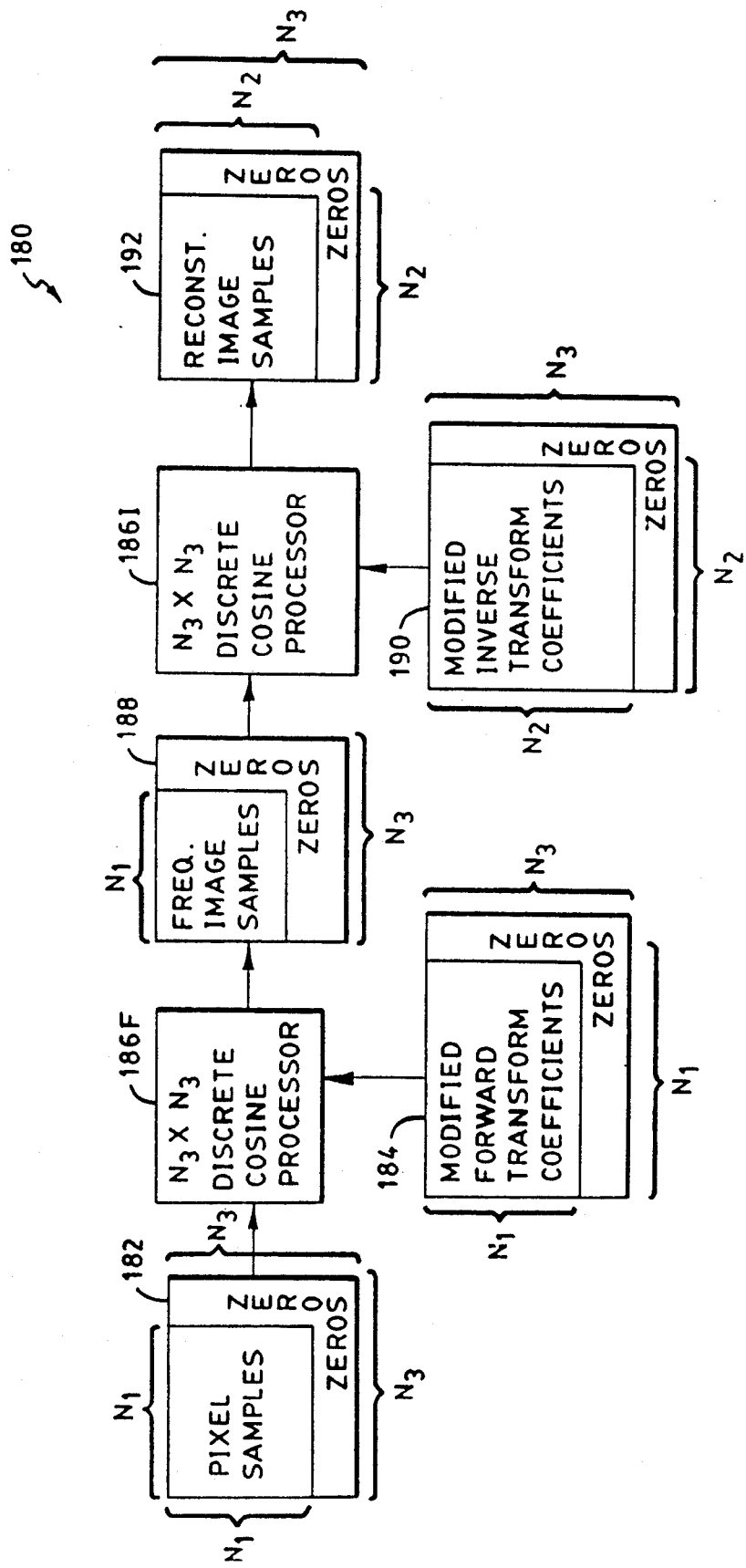
FIG. 5 is a schematic block diagram illustrating the interpolation process of the invention.
Figure 6:
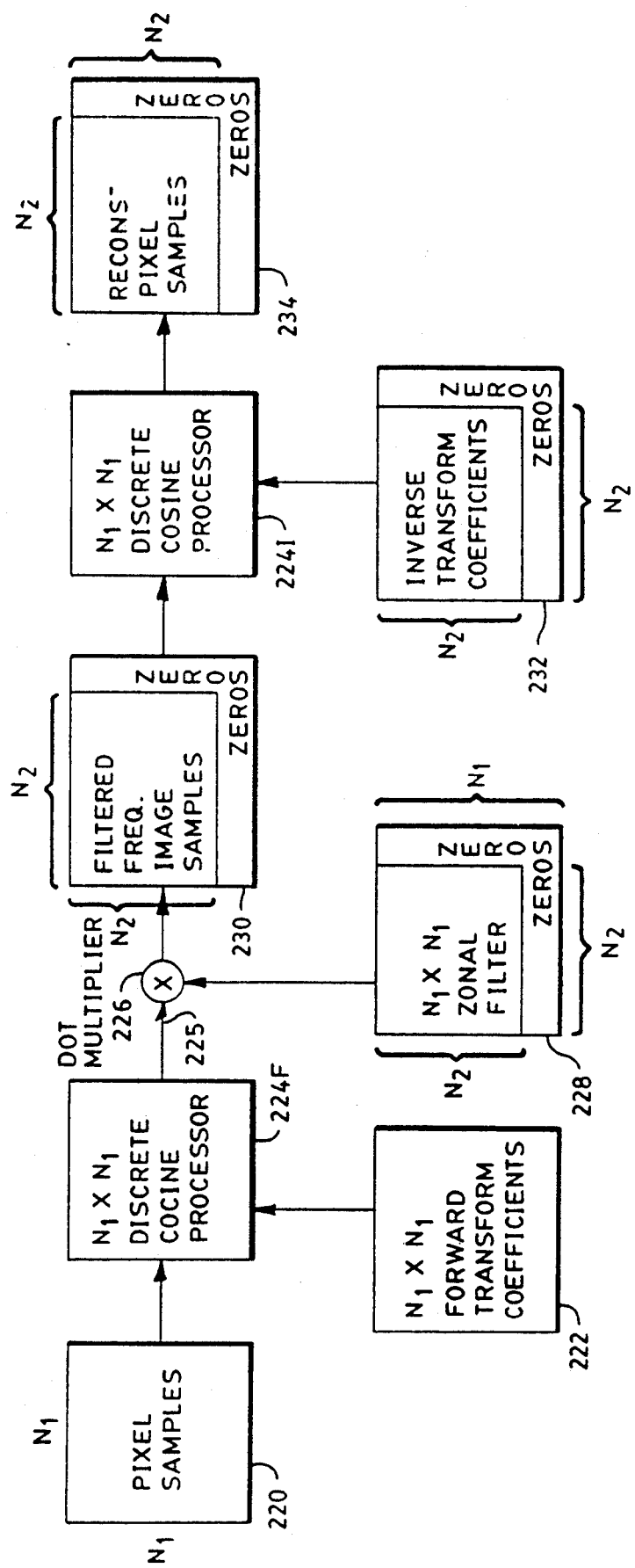
FIG. 6 is a schematic block diagram illustrating the sharpening process of the invention.

FIG. 4 illustrates an exemplary functional arrangement of stand alone hardware, which may be provided separately for practicing the decimation process depicted in FIG. 3 or the interpolation and sharpening processes depicted in FIGS. 5 and 6.

In FIG. 4, the circuitry includes a microprocessor 158, a matrix multiplier 160, an array-transform processor 162, a memory 164 serving as intermediate storage for signals produced by the processor 162, and a memory 166 which provides storage for output signals. For example, the memory 166 may store signals such as data samples or frequency components, produced by the processor 162 and outputted via the memory 164 to the memory 166. The memory 164 is constructed as a random-access memory (RAM) useful in transposing a matrix. The microprocessor 158 provides command signals for control of the multiplier 160, the processor 162 and the memories 164 and 166. A data bus 168 connects the multiplier 160, the processor 162 and the memory 164, and is controlled by a bus controller 170, the latter operating under command of the microprocessor 158.

In FIG. 4, additional memories 172–182 are shown for storage of data or frequency components, kernel components and various transform coefficients. It is understood that, in practice, a single random access memory (RAM) may be employed for storage of data or frequency components. A single read-only memory (ROM) may be employed for storage of the kernel components and the transform coefficients. All of these memories are connected to the data bus 168. Memory 172 stores data samples or frequency components depending on whether a forward transform or an inverse transform is to be performed. The memories further include memory 174 for storage of filter kernel elements, a memory 176 for storage of forward cosine transform coefficients, a memory 178 for storage of forward odd cosine transform coefficients, a memory 180 for storage of forward sine transform coefficients, and a memory 182 for storage of inverse cosine transform coefficients including modified coefficients as referred to in FIG. 3.

In operation, the microprocessor 158 operates the data bus 168 which carries data and forward and inverse transform coefficients to the processor 162 utilizing appropriate stored sine and cosine transform coefficients from blocks 176, 178 and 180. The microprocessor 158 directs the processor 162 to perform a desired forward transformation. At the processor 162, additional zeros may be placed in the kernel matrix to increase the number of elements or the kernel may be already preconfigured with zeros, and the resulting preconfigured or modified matrix is stored temporarily in the memory 164. Similarly, the microprocessor 158 operates the bus 168 to transfer the filter kernel elements to the processor 162 for appropriate selection of the submatrix of kernel elements in the upper left corner of the matrix and subsequently doubles forward transform coefficients, such as the odd cosine or the sine coefficients, to the processor 162 for transforming the modified filter kernel to the frequency domain. DOT multiplication of the frequency domain representation of the filter kernel by the frequency domain representation of the data is accomplished in the matrix multiplier 160 and stored at 164. Thereafter the processor 162 performs inverse transformation on the stored filtered data utilizing stored inverse cosine transform coefficients 182, the result of which is stored at 166. The circuitry of FIG. 4 is thereby able to provide the necessary signal manipulations required of the various processes of the invention.

INTERPOLATION

Like the decimation filter 120, interpolation filter 180 shown in FIG. 5 also operates on $N_1 \times N_1$ sized blocks. However, since interpolation increases the resulting image size, it becomes necessary to use a larger cosine processor. To conform to the larger processor and still operate on $N_1 \times N_1$ blocks, the forward transform coefficients are of the modified form and the actual blocks are sized accordingly.

Interpolation consists of the following processing steps:

1. The image is partitioned into overlapping blocks of size $N_3 \times N_3$. The degree of overlap is such that the resulting non-overlapped blocks are $N_1 \times N_1$. Typical values for $N_3$ are 8 or 16. $N_1$ is 6 or less for the case when $N_3 = 8$ and 14 or less when $N_3 = 16$.

2. The image blocks are processed sequentially and transformed to frequency image samples using the discrete even cosine transform. The forward transform coefficients are modified types not unlike the decimation case.

3. The resulting frequency image matrix is of size $N_3 \times N_3$. However, the sub-block $N_1 \times N_1$ will generally have non-zero elements with zero bottom rows and right columns in the higher frequency positions.

4. The frequency image matrix is converted back to the spatial domain using modified inverse transform coefficients. The coefficients are as in the decimation case, however, the number of non-zero columns and rows $N_2$ is larger than $N_1$. The ratio of $N_2$ to $N_1$ determines the degree of interpolation.

5. The reconstructed image matrix consists of $(N_3 - N_2)$ number of zero columns and rows. Again, these are discarded and the interpolated $N_2 \times N_2$ image is retained.

FIG. 5 presents in schematic block form the frequency domain interpolation filter 180 in accordance with the invention. The description is for a two-dimensional $N_3 \times N_3$ array in which $N_3$ represents the processor array size for JPEG compression/decompression. $N_1 \times N_1$ is the array size of the data and $N_2 \times N_2$ is the desired array size where $N_3 > N_2 > N_1$.

A set of $N_1 \times N_1$ partitioned and filtered samples in block 182, and a set of $N_3 \times N_3$ modified forward transform coefficients in block 184 are applied to $N_3 \times N_3$ forward discrete transform processor 186F for performance of the DECT upon the pixel samples to obtain $N_3 \times N_3$ frequency image samples in block 188. In the process, the pixel data from block 182 and the forward transform coefficients in block 184 are zero padded up to the $N_3 \times N_3$ array size in order to be compatible with the array size of the processor 186F.

The image frequency samples in block 188 are thereafter applied to the inverse discrete cosine processor 186I along with $N_3 \times N_3$ modified inverse transfer coefficients in block 190. In this case, a set of $N_2 \times N_2$ inverse coefficients are zero padded so as to produce the set of modified coefficients in a compatible $N_3 \times N_3$ array size. The processor 186I produces a set of $N_2 \times N_2$ reconstructed pixel samples in the spatial domain in block 192. The $N_2 \times N_2$ array is zero padded so as to be compatible with a display, not shown. In the arrangement illustrated an $N_1 \times N_1$ array of pixel data may be interpolated or expanded to an $N_2 \times N_2$ array in an $N_3 \times N_3$ array processor.

An example of the modified inverse DCT transform matrix to perform an 8-by-8 to 10-by-10 interpolation is as follows. Except for the padded zeros the first and last rows are identical for the 8-by-8 and 10-by-10 transform matrices.

| 1.00 | 1.39  | 1.31  | 1.18  | 1.00  | 0.79  | 0.54  | 0.28  | 0.00 | 0.00 |
|------|-------|-------|-------|-------|-------|-------|-------|------|------|
| 1.00 | 1.18  | 0.54  | −0.28 | −1.00 | −1.39 | −1.31 | −0.79 | 0.00 | 0.00 |
| 1.00 | 0.79  | −0.54 | −1.39 | −1.00 | 0.28  | 1.31  | 1.18  | 0.00 | 0.00 |
| 1.00 | 0.28  | −1.31 | −0.79 | 1.00  | 1.18  | −0.54 | −1.39 | 0.00 | 0.00 |
| 1.00 | −0.28 | −1.31 | 0.79  | 1.00  | −1.18 | −0.54 | 1.39  | 0.00 | 0.00 |
| 1.00 | −0.79 | −0.54 | 1.39  | −1.00 | −0.28 | −1.31 | 1.39  | 0.00 | 0.00 |
| 1.00 | −1.19 | 0.54  | 0.28  | −1.00 | 1.39  | −1.31 | 0.79  | 0.00 | 0.00 |
| 1.00 | −1.39 | 1.31  | −1.18 | 1.00  | −0.79 | 0.54  | −0.28 | 0.00 | 0.00 |

SHARPENING

FIG. 6 represents in schematic block form an exemplary process for frequency domain sharpening. The description is for a two-dimensional $N_1 \times N_1$ array using an $N_2 \times N_2$ filter kernel where $N_1 \geq N_2$ in JPEG compression/decompression.

A set of $N_1 \times N_1$ partitioned pixel samples in block 220 is applied along with a set of $N_1 \times N_1$ forward transfer coefficients in block 222 to $N_1 \times N_1$ discrete forward cosine processor 124F. The DCT processor 224F produces an output 225 of frequency samples which are applied to multiplier 226. An $N_1 \times N_1$ filter kernel which has zonal filter coefficients in block 228 is also applied to the multiplier 226. The multiplier 226 performs a dot product multiplication and produces filtered (sharpened) frequency image samples in block 230. The samples are applied to the inverse DCT processor 224I along with inverse transform coefficients in block 232 to produce sharpened and reconstructed pixel samples in the spatial domain at block 234.

The foregoing description of the sharpening process assumes the use of a linear-phase filter.

PARTITIONING

In accordance with the invention, the field of data is partitioned for piecewise sampling and processing into a set of blocks in which edge portions of contiguous blocks overlap by a swath of rows or columns equal in width to the width of the kernel, assuming an even number of terms in the kernel. An example of a 16-by-16 block of data samples with a 4-by-4 block of kernel elements is described with reference to FIG. 7.

FIG. 7 demonstrates a field of data points covered by four blocks of data points arranged in a square array with the blocks overlapping contiguous blocks. The blocks are identified by the letters A, B, C, and D. Block A overlaps block B by a swath 264 of four rows of data samples. Block D overlaps block C by the same swath 264 of rows of samples. Block A overlaps block D by a swath 266 of columns of data samples. Block B overlaps block C by the swath 266 of columns of data samples. Each of the blocks constitutes a 16-by-16 array of data samples which are located at cells within the array. Cells in a single row at the top of the array are identified as C1-C28. In this example, the total field constitutes an array of 28 columns by 28 rows. There are four overlapping columns in a swath 266 and four overlapping rows in a swath 264. In the vertical swath 266, the individual columns are identified by the legends V1, V2, V3, and V4. In the horizontal swath 261, the individual rows are identified by the legends H1, H2, H3, and H4. In block A, the cells of columns V1 and V2 and of rows H1 and H2 are saved, and the cells of block A residing in the columns V3 and V4 and the rows H3 and H4 are discarded. Corresponding cells in the other blocks are similarly saved and discarded. For example, in block C the cells of the rows H3 and H4 and of the columns V3 and V4 are saved while the cells in block C residing in the rows H1 and H2 and in the columns V1 and V2 are discarded.

FILTER CONVERSION

FIG. 8 demonstrates, diagrammatically, the conversion of 5-by-5 filter kernel to an 8-by-8 filter kernel. The 25-cell kernel is understood to be the kernel of a linear-phase filter. At the left side of FIG. 8, there is a shown a square array of 25 cells wherein a square submatrix of 9 cells is located in the lower right corner of the array. In the submatrix of the 9 cells, each of the cells is identified by a small triangle. The remaining 16 cells are located in the lower numbered columns and in the higher numbered rows, each of the remaining 16 cells being identified by a dot located in the center of each cell. In the procedure for converting the 25-cell array to the 64-cell array, the 9 cells of the submatrix are retained, these being the cells identified by the small triangles, and the remaining cells identified by the dots are discarded. Thereupon, the 9-cell array is zero-padded by placing zeros in the higher numbered columns to the right and in the higher numbered rows to the bottom of the 9-cell array as shown at the right side of FIG. 8. The zero-padded cells are indicated by empty squares. The 9-cell array of the cells identified by the triangles 3 is located as a submatrix in the upper left corner of the 64-cell array.

The invention also provides for the preparation of the filter kernel for use in the frequency domain. For sharpening, the filter kernel at block 228 is constructed as a linear-phase filter kernel formed of an array of $N_2 \times N_2$ odd cosine transform elements. The number of kernel elements is reduced by deletion of kernel elements located in the higher-numbered rows and columns of the field of kernel elements as described above. The enlarged filter kernel 228 is applied to an odd DCT transform processor for transformation into the appropriate frequency domain. Preferably, however, a precomputed DOCT of the kernel is stored in block 228 and applied to multiplier 226 described above.

FILTERING ARCHITECTURE

Figure 9:
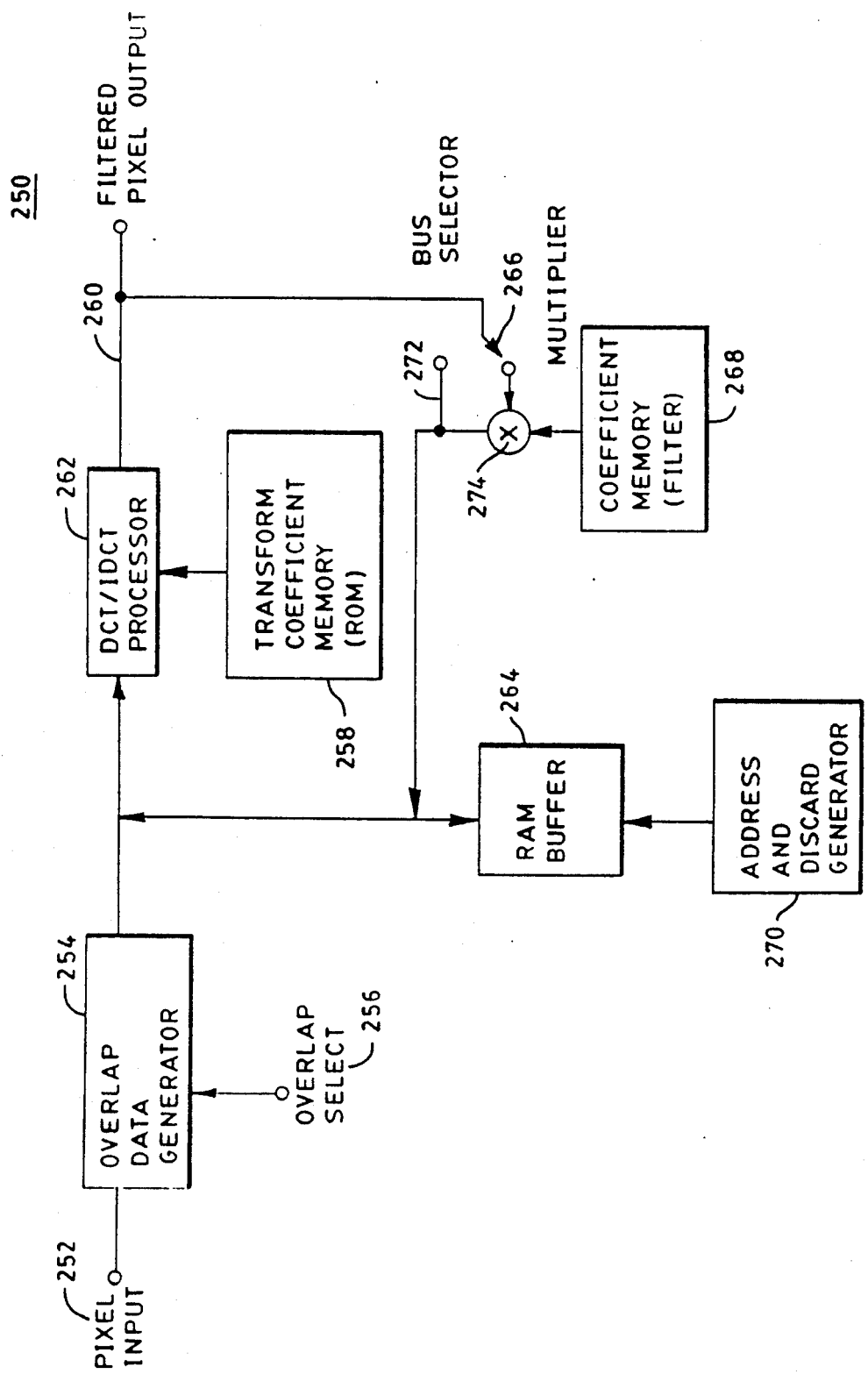
FIG. 9 is a schematic block diagram illustrating a frequency domain filter useful for implementing decimation, interpolation and sharpening in accordance with the invention.

Frequency domain filter 250 shown in FIG. 9 can be employed for various filtering applications including sharpening of digital images as discussed hereinafter, as well as decimation and interpolation of digital images. The filter architecture, reproduced in FIG. 9 shows the major functional blocks of the circuit which include an overlap data generator 254, DCT/IDCT processor 262; RAM buffer memory 264, transform coefficient memory 258; filter coefficient memory 268; address and discard generator 270 and bus selector 266 with multiplier 274.

Previously bandwidth reduced pixel input data 252 is raster scan applied to the filter 250 in flexible overlap data generator 254. Overlapping of image blocks is necessary for a fast convolution filter implementation. For decimation overlapping is not required so that the input data blocks can be passed straight through to the input of DCT/IDCT processor 262. Interpolation requires overlapping blocks for a fixed size DCT/IDCT processor. The amount of overlap depends on the interpolation ratio and can be preselected by overlap select 256 of the overlap data generator 254.

Transform coefficients, both forward and inverse as well as the modified versions, are stored in a read only memory (ROM) of transform coefficient memory 258. The coefficients are selected for the appropriate processing operation. The output 260 of DCT processor 262 is transmitted to random access memory (RAM) buffer 264 via the bus selector switch 266. The bus selector switch 266 allows filter coefficient memory 268 to be bypassed when this operation is not needed. From the previous description of the decimation filter 120 and interpolation filter 180, filter coefficients 268 are not necessary and are thus bypassed when performing such functions. The address and discard generator 270 is employed to selectively read out data to output 260.

On the forward pass through the DCT/IDCT processor 262 (hereinafter processor 262) computed frequency samples resulting from convolution of pixel data 252 and transform coefficients 258 for each block are stored in the RAM 264 with processor 262 in the bypass mode and bus selector 266 configured as shown, stored frequency samples are dot multiplied in multiplier 274 by filter coefficients in memory 268 and stored in RAM 264 as filtered pixels. For the inverse, filtered pixels are accessed from RAM 264 and inverse processed in processor 262 with transform coefficients 258. Resulting reconstructed filtered pixels written back to RAM 264. After this pass is completed, the processor 262 switches to the pass through mode and RAM 264 is accessed in conjunction with address and discard generator 270 in such a fashion to discard selected zero columns and rows of the reconstructed books.

In a preferred embodiment, the frequency domain filter 250 shown in FIG. 9 may be used to perform decimation, interpolation and sharpening. As a decimator, the filter 250 performs a DCT on selected transfer coefficients stored in the coefficient memory 258, the results of which are stored in RAM 264 with selector 266 in the bypass position 272. The processor 262 is then switched to the inverse mode and the transformed data is subjected to an inverse DCT using modified inverse transfer coefficients stored in transform coefficient memory 258, which have been row $R_1$ pixels $P_{10}$ through $P_{1,799}$ and so on. The submatrices are structured in the following manner.

$$S_{00} = \begin{bmatrix} P_{00} & \cdots & P_{07} \\ \cdot & & \cdot \\ \cdot & & \cdot \\ P_{70} & \cdots & P_{77} \end{bmatrix} S_{01} = \begin{bmatrix} P_{07} & \cdots & P_{0,14} \\ \cdot & & \cdot \\ \cdot & & \cdot \\ P_{77} & \cdots & P_{7,14} \end{bmatrix} \cdots S_{0n}$$

TABLE I

| | | | | | | | | | | | | | | | |
|---|---|---|---|---|---|---|---|---|---|---|---|---|---|---|---|
| $R_0$: | $P_{00}$ | $P_{01}$ | $P_{02}$ | $P_{03}$ | ... | $P_{06}$ | $P_{07}$ | $P_{08}$ | $P_{09}$ | $P_{0,10}$ | $P_{0,11}$ | $P_{0,12}$ | $P_{0,13}$ | $P_{0,14}$ | ... $P_{0,799}$ |
| $R_1$: | $P_{10}$ | $P_{11}$ | $P_{12}$ | $P_{13}$ | ... | $P_{16}$ | $P_{17}$ | $P_{18}$ | $P_{19}$ | $P_{1,10}$ | $P_{1,11}$ | $P_{1,12}$ | $P_{1,13}$ | $P_{1,14}$ | ... $P_{1,799}$ |
| $R_2$: | $P_{20}$ | $P_{21}$ | $P_{22}$ | $P_{23}$ | ... | $P_{26}$ | $P_{27}$ | $P_{28}$ | $P_{29}$ | $P_{2,10}$ | $P_{2,11}$ | $P_{2,12}$ | $P_{2,13}$ | $P_{2,14}$ | ... $P_{2,799}$ |
| $R_6$: | $P_{60}$ | $P_{61}$ | $P_{62}$ | $P_{63}$ | ... | $P_{66}$ | $P_{67}$ | $P_{68}$ | $P_{69}$ | $P_{6,10}$ | $P_{6,11}$ | $P_{6,12}$ | $P_{6,13}$ | $P_{6,14}$ | ... $P_{6,799}$ |
| $R_7$: | $P_{70}$ | $P_{71}$ | $P_{72}$ | $P_{73}$ | ... | $P_{76}$ | $P_{77}$ | $P_{78}$ | $P_{79}$ | $P_{7,10}$ | $P_{7,11}$ | $P_{7,12}$ | $P_{7,13}$ | $P_{7,14}$ | ... $P_{7,799}$ |
| $R_8$: | $P_{80}$ | $P_{81}$ | $P_{82}$ | $P_{83}$ | ... | $P_{86}$ | $P_{87}$ | $P_{88}$ | $P_{89}$ | $P_{8,10}$ | $P_{8,11}$ | $P_{8,12}$ | $P_{8,13}$ | $P_{8,14}$ | ... $P_{8,799}$ |
| $R_9$: | $P_{90}$ | $P_{91}$ | $P_{92}$ | $P_{93}$ | ... | $P_{96}$ | $P_{97}$ | $P_{98}$ | $P_{99}$ | $P_{9,10}$ | $P_{9,11}$ | $P_{9,12}$ | $P_{9,13}$ | $P_{9,14}$ | ... $P_{9,799}$ |
| $R_{12}$: | $P_{12,0}$ | $P_{12,1}$ | $P_{12,2}$ | $P_{12,3}$ | ... | $P_{12,6}$ | $P_{12,7}$ | $P_{12,8}$ | $P_{12,9}$ | $P_{12,10}$ | $P_{12,11}$ | $P_{12,12}$ | $P_{12,13}$ | $P_{12,14}$ | ... $P_{12,799}$ |
| $R_{13}$: | $P_{13,0}$ | $P_{13,1}$ | $P_{13,2}$ | $P_{13,3}$ | ... | $P_{13,6}$ | $P_{13,7}$ | $P_{13,8}$ | $P_{13,9}$ | $P_{13,10}$ | $P_{13,11}$ | $P_{13,12}$ | $P_{13,13}$ | $P_{13,14}$ | ... $P_{13,799}$ |
| $R_{14}$: | $P_{14,0}$ | $P_{14,1}$ | $P_{14,2}$ | $P_{14,3}$ | ... | $P_{14,6}$ | $P_{14,7}$ | $P_{14,8}$ | $P_{14,9}$ | $P_{14,10}$ | $P_{14,11}$ | $P_{14,12}$ | $P_{14,13}$ | $P_{14,14}$ | ... $P_{14,799}$ |
| $R_{799}$: | $P_{799,0}$ | $P_{799,3}$ | ... | | | | | | | | | | | | $P_{799,799}$ |
| | $C_0$ | $C_1$ | $C_2$ | $C_3$ | ... | $C_6$ | $C_7$ | $C_8$ | $C_9$ | $C_{10}$ | $C_{11}$ | $C_{12}$ | $C_{13}$ | $C_{14}$ | ... $C_{799}$ | modified by removal of high frequency components in the right hand columns and bottom rows by substitution of zeros therein. The reconstructed data is then read out in decimated form under the control of the address and discard generator 370 which drops overlapping rows and columns. In the case of decimation overlap is zero.

As an interpolator, the same sequence occurs as above described except that an overlap in overlap data generator 254 is established by overlap select 256. The data is transformed in processor 262 by appropriate forward transform coefficients and inverse transform coefficients selected from ROM 258. These may be modified to accommodate the processor configuration as earlier described with respect to FIG. 5.

Sharpening is a piecewise filtering operation. After an appropriate overlap selection, the data is discrete cosine transformed in processor 262. The transformed data is stored in the RAM 264. The data may then be clocked through the processor 262 with the bus selector 266 in the position shown. The data is then dot multiplied at 274 by appropriate coefficients stored in the coefficient memory 268, the result of which is placed in the ROM 264. Thereafter, an inverse DCT is performed with a bus selector 266 in the bypass position 272. Reconstructed data is stored in the RAM buffer 264. The reconstructed data is then read out of the buffer 264 by address and discard generator 270 which drops overlapping data and is passed through processor 162 in the pass through mode.

OVERLAP GENERATOR ARCHITECTURE

Figure 10:
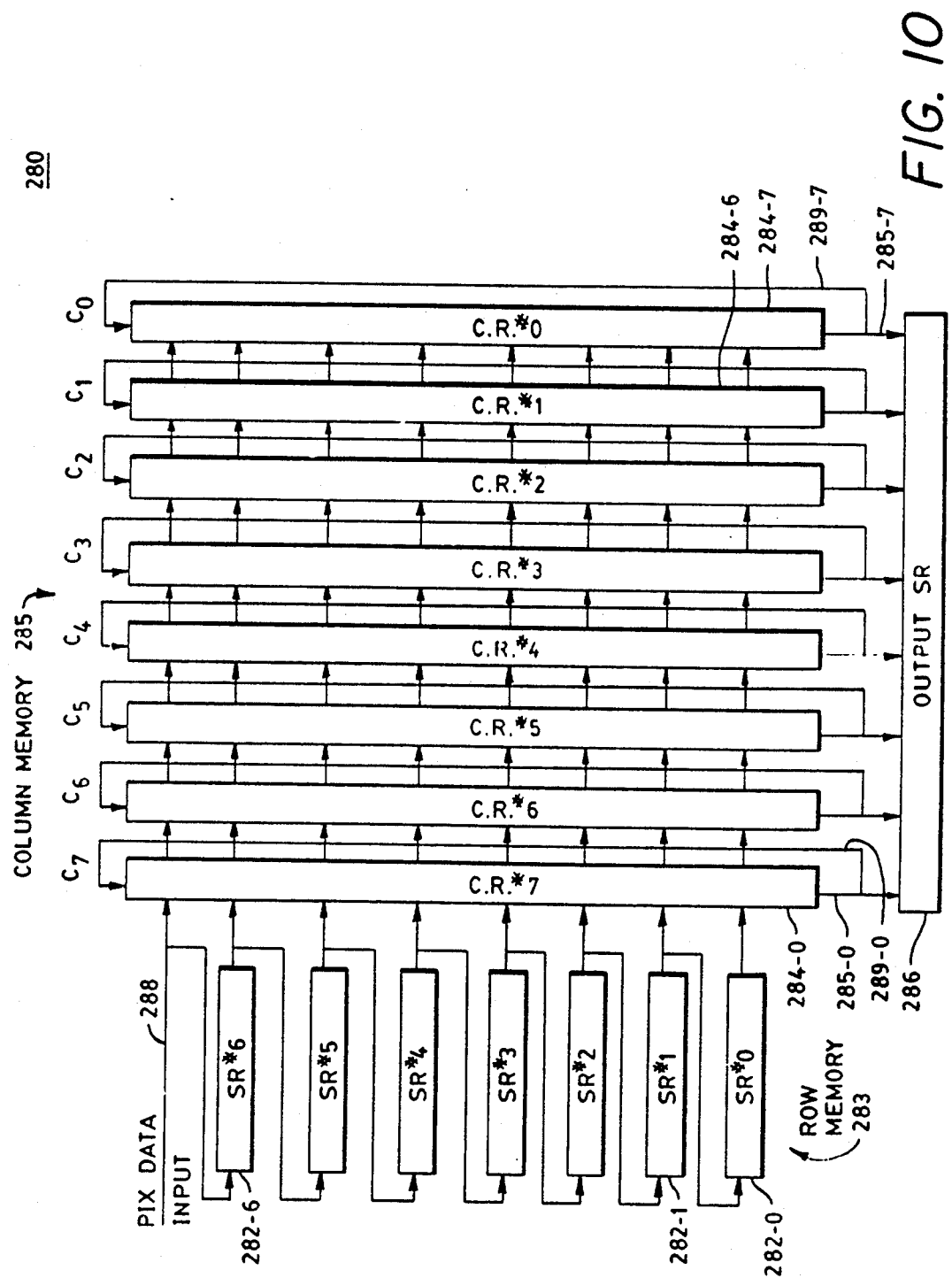
FIG. 10 is a schematic block diagram illustrating an overlap generator according to the present invention.

FIG. 10 illustrates one embodiment of an overlap data generator 280 which partitions the image matrix data into overlapping N×N pixel sub-matrices. The overlap is typically one pixel wide but can also be greater. The following example of an 8×8 matrix illustrates the one pixel case.

The image matrix in this instance consists of 800 rows $R_0$ to $R_{799}$. Each row in turn consists of 800 pixels. Clearly, row $R_0$ is made up of pixels. $P_{00}$ through $P_{0,799}$, $$S_{10} = \begin{bmatrix} P_{70} & \cdots & P_{77} \\ \cdot & & \cdot \\ \cdot & & \cdot \\ P_{14,0} & \cdots & P_{14,7} \end{bmatrix} S_{11} = \begin{bmatrix} P_{77} & \cdots & P_{7,14} \\ \cdot & & \cdot \\ \cdot & & \cdot \\ P_{14,7} & \cdots & P_{14,16} \end{bmatrix} \cdots S_{1n}$$

$$\begin{matrix} \cdot & & & & \cdot \\ \cdot & & & & \cdot \\ S_{n0} & & & & \cdots S_{nn} \end{matrix}$$

$S_{00}$ and $S_{01}$ are the first two submatrices along the horizontal direction. Matrices $S_{10}$ and $S_{11}$ are immediately below $S_{00}$ and $S_{01}$. The last columns of $S_{00}$ and $S_{10}$ are the first columns of $S_{01}$ and $S_{11}$, respectively. The last rows of $S_{00}$ and $S_{01}$ are the first rows of $S_{10}$ and $S_{11}$, respectively.

The partitioning of the image matrix in this fashion can be accomplished by the overlap generator 280 which processes images in a raster scan format and possesses a simple architecture which includes seven serially connected row shift registers 282-0 ... 282-6 in a row memory 283; eight column shift registers 284-0 ... 284-7 in a parallel column memory 285 and a parallel output shift register 286. The row shift registers 282-0 ... 282-6 are each capable of storing one row of image data or 800 pixels. The column shift registers 284-0 ... 284-7 store the columns of the submatrices and therefore are capable of storing eight pixels each. The output shift register 286 serializes the submatrix rows and thus needs to store only eight pixels.

The circuit operates in the following manner. Beginning with the top of the image in raster scan, pixel data $R_0$–$R_8$ is shifted into an input 288 of the row shift registers 282-0–282-6, one row at a time. When seven rows have been stored, $R_0$ will be positioned in row shift register 282-0, $R_1$ in 282-1 and so on to $R_6$ in 282-6.

After the first pixel ($P_{70}$) of $R_7$ appears at the input 288, it, along with the serial outputs from each of the row shift registers 282-0 ... 282-6 are loaded in parallel into the column shift register 284-7. Thus, the column shift register 284-7 stores the eight pixels $P_{00}$, $P_{10}$, $P_{20}$, $P_{30}$, ... $P_{60}$, $P_{70}$, or column 0 of submatrix $S_{00}$. With arrival of the next pixel at the input 288, data in column shift register 284-7 is transferred to column shift register 284-6 and column shift register 284-7 is loaded with the new pixels $P_{01}$, $P_{11}$, $P_{21}$, $P_{31}$, ... $P_{61}$, $P_{71}$ or column 1 of the submatrix $S_{00}$. After eight such transfers, $S_{00}$ will be stored in the column shift registers 284-0 ... 284-7. The rows of $S_{00}$ are then ready to be loaded one at a time from a corresponding output 285-0 ... 285-7 of column memory 285 into the output 286.

The outputs 285-0 ... 285-7 of the column memory 285 which feed output shift register 286 are simultaneously fed back via serial inputs 289-0 ... 289-7, so as to retain the stored data. Access to the individual pixels of the submatrix is accomplished by right shifting the output of output shift register 286.

When all pixels in the column shift registers 284-0 ... 284-7 have been read out, the next set of columns from the row memory 283 are shifted across.

In an exemplary arrangement, to achieve a one column overlap, only seven columns $C_1$-$C_7$ will be shifted, so that on the next cycle the column $C_7$ already stored in column shift register 284-0 will end up in column shift register 284-7. As may be readily apparent, previously stored pixels in the same register are lost. After the column shift sequence, submatrix $S_{01}$ is stored in column shift registers 284-0 ... 284-7. Again, as before, the pixels are accessed via the output shift register 286.

After 800 columns of rows $R_0$-$R_7$ have been processed in this fashion, the first eight columns $C_0$-$C_7$ of the next set of rows $R_7$-$R_{14}$ are read into the row memory 283. Again, to achieve a one row overlap, the serial outputs from the row memory 283 begin loading into column shift register 284-0 when row $R_7$ is stored in row shift register 282-0 and the first pixel of $R_{14}$ appears at the data input 288. In this way the image is partitioned into $8 \times 8$ overlapping submatrices.

Figure 11:
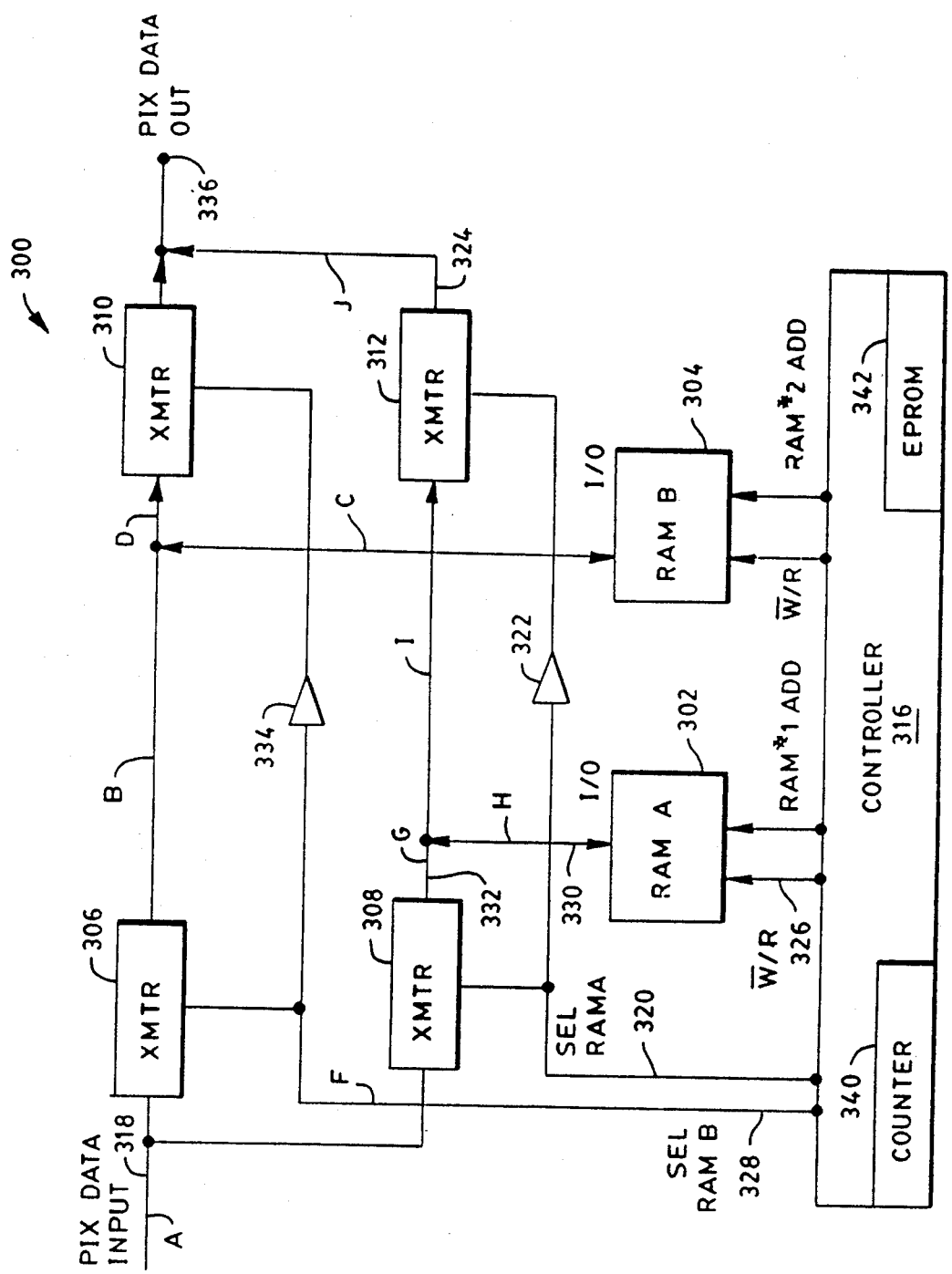
FIG. 11 is a schematic block diagram of an alternative overlap generator according to the invention.

Although the design in FIG. 10 is simple, the large data shift registers needed for the row memory 283 makes it expensive to implement. By using RAM circuits, the cost is reduced considerably. Such an alternate architecture for an overlap generator or processor 300 having an input 318 and output 336 is illustrated in the block diagram of FIG. 11. The major components include respective RAM (A) and RAM (B) buffer memories 302 and 304, each capable of storing eight rows of pixels, four bus transmitters (XMTRs) 306, 308, 310 and 312 which route the pixel data streams to the RAM's 302 and 304, a controller 316 for memory control address generation and data bus control, inverters 322 and 334 and various select and read write/lines hereinafter described. Various data paths A-J and I/Os are shown in FIG. 11 and will also be described. The advantage of double buffering is increased speed as well as the ability to handle a continuous data stream at the input 318 of the processor 300. The speed increase is possible because as one RAM is being read the other is storing data.

The processing of the image pixels begins by sequentially writing the first eight rows into RAM 302. This is accomplished by enabling bus transmitter 308 with a SEL RAM (A) WRITE control line 320. Pixel data is transmitted to RAM (A) by data path A-F-G-H. Inverter INV 322 on SEL RAM (A) write line 320 disables XMTR 312 and thus places its output 324 in the high impedance state. At the same time, RAM (A) 302 is in a write mode controlled by W/R line 326. Addresses are generated by a 13 bit binary counter 340 in controller 316. The contents of RAM (A) 302 after the first eight rows have been written is as shown in Table II. The last row, that is, the one which is overlapping, $R_7$ in this instance, is also written to RAM (B) 304. This makes the data $R_7$ available when the next eight rows are processed. The data is transmitted to RAM (B) 304 by enabling XMTR 306 with SEL RAM (B) 304 WRITE line 328 being active. The data path for RAM (B) 304 is A-B-C. When $R_7$ has been transmitted, RAM (A) 302 is switched to read mode by W/R line 326 and RAM 304 continues to store rows $R_8$ through $R_{14}$. An I/O port 330 on RAM (A) 302, meanwhile, is switched to an output mode by enabling XMTR 312 with control line 320 (SEL RAM (A) WRITE) and INV 322. XMTR 308 is disabled, its output 332 switches to a high impedance state and the data path is along H-I-J-E. At the same time, XMTR 310 is also in the high impedance state since it is disabled by SEL RAM (B) WRITE and INV 334.

TABLE II

| MEMORY #1 | ADDRESS | CONTENTS | |
|---|---|---|---|
| | 0 | $P_{00}$ | $R_0$ |
| | 1 | $P_{01}$ | |
| | 2 | $P_{02}$ | |
| | . | . | |
| | . | . | |
| | 799 | $P_{0,799}$ | $R_1$ |
| | 800 | $P_{10}$ | |
| | 801 | $P_{11}$ | |
| | 802 | $P_{12}$ | |
| | . | . | |
| | . | . | |
| | 1599 | $P_{1,799}$ | $R_2$ |
| | 1600 | $P_{20}$ | |
| | 1601 | $P_{21}$ | |
| | 1602 | $P_{22}$ | |
| | . | . | |
| | . | . | |
| | 2399 | $P_{2,799}$ | $R_3$ |
| | 2400 | $P_{30}$ | |
| | 2401 | $P_{31}$ | |
| | 2402 | $P_{32}$ | |
| | . | . | |
| | . | . | |
| | 3199 | $P_{3,799}$ | |
| | . | . | |
| | . | . | |
| | 5600 | $P_{70}$ | $R_7$ |
| | 5601 | $P_{71}$ | |
| | 5602 | $P_{72}$ | |
| | . | . | |
| | . | . | |
| | 6399 | $P_{7,799}$ | |

TABLE III

| MEMORY #1 | ADDRESS | CONTENTS | |
|---|---|---|---|
| | 0 | $P_{00}$ | $R_0$ of $S_{00}$ |
| | 1 | $P_{01}$ | |
| | 2 | $P_{02}$ | |
| | . | . | |

TABLE III-continued

| MEMORY #1 ADDRESS | CONTENTS | |
|---|---|---|
| . | . | |
| . | . | |
| . | . | |
| 7 | $P_{07}$ | $R_1$ of $S_{00}$ |
| 800 | $P_{10}$ | |
| 801 | $P_{11}$ | |
| 802 | $P_{12}$ | |
| . | . | |
| . | . | |
| . | . | |
| 807 | $P_{17}$ | $R_2$ of $S_{00}$ |
| 1600 | $P_{20}$ | |
| 1601 | $P_{21}$ | |
| 1602 | $P_{22}$ | |
| . | . | |
| . | . | |
| . | . | |
| 1607 | $P_{27}$ | $R_3$ of $S_{00}$ |
| 2400 | $P_{30}$ | |
| 2401 | $P_{31}$ | |
| 2402 | $P_{32}$ | |
| . | . | |
| . | . | |
| . | . | |
| 2407 | $P_{37}$ | |
| . | . | |
| . | . | |
| . | . | |
| 5600 | $P_{70}$ | $R_7$ of $S_{00}$ |
| 5601 | $P_{71}$ | |
| 5602 | $P_{72}$ | |
| . | . | |
| . | . | |
| . | . | |
| 5607 | $P_{77}$ | $R_0$ of $S_{01}$ |
| 7 | $P_{07}$ | |
| 8 | $P_{08}$ | |
| 9 | $P_{09}$ | |
| . | . | |
| . | . | |
| . | . | |
| 14 | $P_{014}$ | $R_1$ of $S_{01}$ |
| 807 | $P_{17}$ | |
| 808 | $P_{18}$ | |
| 809 | $P_{19}$ | |
| . | . | |
| . | . | |
| . | . | |
| 814 | $P_{1,14}$ | |
| . | . | |
| . | . | |
| . | . | |

The data read from RAM 302 must be accessed so that it is in blocked form at the output 336. The address sequences cannot readily be generated with a binary counter. Accordingly, a table of addresses is employed as shown in Table III.

To illustrate the addressing pattern, Table III lists the sequences for the eight rows of submatrix $S_{00}$ followed by the first two rows of submatrix $S_{01}$. Accessing a submatrix requires 64 addresses, eight addresses for each of the eight rows. The staring address of each row is offset by 800, corresponding to the number of pixels in the rows of the image. Also, the addresses repeat at overlapping pixels. This is because accesses to the same data locations in the memory is necessary to retrieve those pixels.

Since the sequence is relatively short, that is 114 blocks×64 addresses or 7296 addressed total, it can be generated by a simple table look up circuit or ROM. The sequence is preprogrammed in an 8K EPROM 342 which is accessed by the 13 bit binary counter 340 in controller 316. With the sequence shown in the Table III, the data will be accessed in row major form for each submatrix, moving horizontally across the image from left to right.

Reading of the data must be somewhat faster than writing so that the memory becomes available when RAM (B) 304 has been filled and the data stream switches again to RAM (A) 302. As before, the last row of data is simultaneously written into RAM (B) 304 and RAM (A) 302 to make the overlap. At this point RAM (B) 304 data is transmitted to the output port 336 and the next seven rows of the image are written to RAM (A) 302. RAM (B) 304 data is read with the same address sequence of Table III as previously described. In this fashion, the process continuous until the entire image has been partitioned into the desired submatrices.

The architecture illustrated in FIG. 11 has sufficient flexibility so that the amount of overlap can be easily changed. This may be accomplished by reprogramming the EPROM address generator and simultaneously changing the required number of lines for the overlap.

In view of the foregoing description, it is apparent that the invention has accomplished a major objective of enabling the functions of decimation and interpolation, as well as the function of sharpening/convolution to be accomplished by the use of hardware built for JPEG and MPEG compression circuitry.

It is to be understood that the above described embodiment of the invention is illustrative only, and that modifications thereof may occur to those skilled in the art. Accordingly, this invention is not to be regarded as limited to the embodiment disclosed herein, but is to be limited only as defined by the appended claims.

It will be understood that the process described above for sharpening can also be used to decimate, interpolate, and filter any digital signal since it is a DCT implementation of a fast convolution. However, the procedures described above for decimation and interpolation of blocked data without overlap are substantially simpler and ideally suited for use on compressed JPEG standard images. The IDCT and image scaling are also combined into a single step. Although the procedures described for the decimation and interpolation are not as rigorous as that described for sharpening, it nevertheless provides substantially artifact free results.

What is claimed is:

1. A method for processing a field of image data samples by means of at least one array transform processor, said at least one array transform processor being operative to form a transformation between a spatial domain and a frequency domain of a block of said data samples wherein said transformation is a forward transformation or an inverse transformation and wherein said transformation furthermore is a discrete cosine transformation (DCT) or a discrete sine transformation (DST) and wherein said discrete cosine transformation is a discrete even cosine transformation (DECT) or a discrete odd cosine transformation (DOCT), said method comprising steps of:

extracting a block of a number of samples from said field of samples;
  performing said forward transformation on said block of samples to provide a matrix of a number of frequency components;
  altering the frequency components in said matrix to provide a modified matrix; and
  performing said inverse transformation on said modified matrix of frequency components to attain a set of data samples different from the samples in said block of samples.

2. A method according to claim 1 wherein said step of altering is accomplished by altering the number of frequency components in said matrix, the number of samples in said set of data samples being different from the number of samples in said block of samples.

3. A method according to claim 2 wherein said inverse transformation is performed by an array transform processor having an array with more locations than the number of the frequency components in said modified matrix, said method further comprising the steps of:
   zero-padding said modified matrix and a matrix of inverse transform coefficients to be employed in said inverse transformation prior to said step of performing said inverse transformation; and
   subsequent to said step of performing said inverse transformation, discarding excess zero terms to attain said set of data samples.

4. A method according to claim 2 wherein said processing of the field of image data samples provides for a decimation of the field of data samples, said step of altering the number of frequency components in said matrix of frequency components is accomplished by deletion of highest frequency components of said matrix, said forward transformation is a DECT and the number of samples in said set of samples is less than the number of samples in said block of samples.

5. A method according to claim 4 wherein said inverse transformation is performed by an array transform processor having an array with more locations than the number of the frequency components in said modified matrix, said method further comprising said steps of:
   zero-padding said modified matrix and a matrix of inverse transform coefficients to be employed in said inverse transformation prior to said step of performing said inverse transformation; and
   subsequent to said step of performing said inverse transformation, discarding excess zero terms to attain said set of data samples.

6. A method according to claim 2 wherein said processing of the field of image data samples accomplishes an interpolation of the field of image data samples, the number of samples in said set of data samples is greater than the number of samples in said block of data samples, said step of altering the number of frequency components in said matrix of frequency components is accomplished by inserting additional higher frequency components of zero amplitude into said matrix of frequency components, said inverse transformation employs a matrix of modified inverse transformation coefficients with the number of terms in the matrix of inverse transformation coefficients being equal to the number of terms in said matrix of frequency components, and said forward transformation is a DCT.

7. A method according to claim 6 wherein said inverse transformation is performed by an array transform processor having an array with more locations than the number of the frequency components in said modified matrix, said method further comprising said steps of:
   zero-padding said modified matrix and a matrix of inverse transform coefficients to be employed in said inverse transformation prior to said step of performing said inverse transformation; and
   subsequent to said step of performing said inverse transformation, discarding excess zero terms to attain said set of data samples.

8. A method according to claim 6 wherein said forward transformation is performed by an array transform processor having an array with more locations than the number of the data samples in said block, the number of data samples in said block being equal to the number of terms in a matrix of forward transform coefficients employed in said step of performing said forward transformation, said method further comprising steps of:
   inserting additional samples of zero amplitude to the right of and below the samples of said block to provide a matrix of data samples having a number of terms equal to the number of locations of the array transform processor;
   inserting additional forward transform coefficients of zero value to the right of and below the coefficient of the matrix of forward transform coefficients to provide a modified forward transform matrix having a number of coefficients equal in number to the number of the locations of said array transform processor, said step of performing said forward transformation being accomplished by use of said matrix of data samples and said modified forward transform matrix; and
   discarding excess frequency components of zero value resulting from the step of performing the forward transformation.

9. A method according to claim 1 further comprising steps of:
   providing a filter kernel in the spatial domain for processing said field of data samples;
   performing said forward transformation on said filter kernel to provide a matrix of a number of kernel frequency components; and
   wherein said step of altering is accomplished by multiplying the frequency components in the matrix of transformed data samples by the kernel frequency components in a matrix dot-product multiplication.

10. A method according to claim 9 wherein said inverse transformation is performed by an array transform processor having an array with more locations than the number of the frequency components in said modified matrix, said method further comprising said steps of:
    zero-padding said modified matrix and a matrix of inverse transform coefficients to be employed in said inverse transformation prior to said step of performing said inverse transformation; and
    subsequent to said step of performing said inverse transformation, discarding excess zero terms to attain said set of data samples.

11. A method according to claim 9 wherein said step of performing said forward transformation on said block of data samples is accomplished by the DECT.

12. A method according to claim 11 wherein said step of performing said forward transformation on the filter kernel is accomplished by the DOCT.

13. A method according to claim 9 further comprising steps of:
    sectioning said field of data samples into a plurality of blocks prior to performance of said step of extracting a block, said extracting step being performed sequentially for sequentially processing each of the blocks to provide a sequence of sets of said set of data samples, the data samples of said sets differing from the data samples of said blocks by virtue of processing in said multiplying step, there being an array of processed data samples in each of said sets arranged correspondingly to an array of original data samples in corresponding ones of said blocks;

arranging said sets to provide an array of partially overlapping blocks of processed data samples; and saving processed data samples at predesignated locations in each set, and discarding excess processed data samples located in overlapped regions of contiguous sets to provide a second field of filtered data samples equal in number to the data samples of the first mentioned field of data samples.

14. A method according to claim 9 further comprising steps of:

modifying a matrix representation of said filter kernel in the spatial domain by deletion of a portion of the kernel components from the kernel matrix wherein the filter kernel has a linear-phase characteristic;

inserting additional kernel components of zero value to the right side and below components of the filter kernel to increase the number of kernel components to equal the number of data samples in a block of data samples, said step of inserting the additional kernel components being accomplished prior to said step of performing the forward transformation of the filter kernel; and wherein said forward transformation is a DOCT.

15. A method according to claim 14 wherein said step of performing said forward transformation on said block of data samples is accomplished by the DECT; and further comprising steps of:

sectioning said field of data samples into a plurality of blocks prior to performance of said step of extracting a block, said extracting step being performed sequentially for sequentially processing each of the blocks to provide a sequence of sets of said set of data samples, the data samples of said sets differing from the data samples of said blocks by virtue of processing in said multiplying step, there being an array of processed data samples in said set arranged correspondingly to an array of original data samples in corresponding ones of said blocks;

arranging said sets to provide an array of partially overlapping blocks of processed data samples; and saving processed data samples at predesignated locations in each set, and discarding excess processed data samples located in overlapped regions of contiguous sets to provide a second field of filtered data samples equal in number to the data samples of the first mentioned field of data samples.

16. A method for processing a field of image data samples by means of at least one array transform processor, being operative to form forward and inverse discrete cosine transformations between a spatial domain and a frequency domain of a block of said data samples using matrices of forward and inverse transform coefficients respectively comprising steps of:

extracting a block of a number of samples from said field of samples;

selectively modifying the matrix of at least one of the forward and inverse transform coefficients;

performing said forward transformation on said block of samples to provide a matrix of a number of frequency components using the forward transform coefficients using the forward transform coefficients;

performing said inverse transformation on said matrix of frequency components to attain a reconstructed set of data samples different from the samples in said block of samples using selectively modified inverse transform coefficients.

17. A method according to claim 16 wherein modifying the matrix of inverse transform coefficients comprises deleting selected high frequency components of said matrix of inverse transform coefficients for decimating the image data.

18. A method according to claim 17 further comprising the steps of:

zero-padding said modified matrix of inverse transform coefficients to be employed in said inverse transformation prior to said step of performing said inverse transformation.

19. A method according to claim 16 wherein performing said forward transformation includes using modified matrix forward transfer coefficients.

20. A method according to claim 19 wherein modifying the forward coefficients comprises deleting selected high frequency components of said matrix.

21. A method according to claim 20 further comprising zero-padding said modified matrix of forward transform coefficients to be employed in said forward transformation prior to said step of performing said forward transformation.

22. Apparatus processing a field of image data samples by means of at least one array transform processor, being operative to form a transformation between a spatial domain and a frequency domain of a block of said data samples comprising:

means for extracting a block of a number of samples from said field of samples;

storage means for storing at least one of modified and unmodified matrices of forward and inverse transform coefficients, said matrices being modified for selectively enabling at least one of decimation and interpolation of the image data without filtering said data;

selector means for selecting at least one of the modified and unmodified transform coefficients; and processor means responsive to the storage means and selector means performing said forward transformation on said block of samples to provide a matrix of a number of frequency components using at least one of modified and unmodified transform coefficients, said processor means for performing said inverse transformation on said modified matrix of frequency components to attain a set of data samples different from the samples in said block of samples using modified inverse transform coefficients.

* * * * *